United States Patent
Larson et al.

(10) Patent No.: US 6,408,068 B1
(45) Date of Patent: Jun. 18, 2002

(54) MODULAR TELEPHONE

(75) Inventors: Kent W. Larson, St. Paul, MN (US); Debra Lea Enfield, San Diego, CA (US); Bradley J. Koehler, Minnetonka, MN (US)

(73) Assignee: Kool! Technologies, Inc., St. Paul, MN (US)

( * ) Notice: Subject to any disclaimer, the term of this patent is extended or adjusted under 35 U.S.C. 154(b) by 0 days.

(21) Appl. No.: 09/183,435

(22) Filed: Oct. 30, 1998

(51) Int. Cl.⁷ .................. H04M 11/00; H04M 11/02

(52) U.S. Cl. .................. 379/357.01; 379/356.01; 379/357.02; 379/357.05; 379/353; 379/434; 379/93.05

(58) Field of Search ................. 379/351–361, 379/93.06, 282, 434; 455/331, 90

(56) References Cited

U.S. PATENT DOCUMENTS

| | | | |
|---|---|---|---|
| D256,238 S | 8/1980 | Akazawa ................. D14/68 |
| D287,586 S | 1/1987 | Tanaka et al. ............. D14/53 |
| 4,740,172 A | * 4/1988 | Tubbs ..................... 439/344 |
| 4,792,986 A | 12/1988 | Garner et al. .............. 455/89 |
| 4,866,766 A | * 9/1989 | Mitzlaff ................... 379/374 |
| 5,062,132 A | 10/1991 | Yasuda et al. .............. 379/61 |
| 5,257,414 A | 10/1993 | Trahan et al. .............. 455/90 |
| 5,371,785 A | 12/1994 | Marcinkiewicz ........... 379/267 |
| 5,418,837 A | 5/1995 | Johansson et al. .......... 379/58 |
| 5,490,202 A | 2/1996 | Maekawa .................. 379/58 |
| 5,541,985 A | 7/1996 | Ishii ....................... 379/111 |
| 5,604,787 A | 2/1997 | Kotzin .................... 379/58 |
| 5,615,250 A | 3/1997 | Kobayashi ................ 379/61 |
| 5,630,159 A | 5/1997 | Zancho ................... 395/800 |
| 5,633,920 A | 5/1997 | Kikinis et al. ............ 379/130 |
| D379,983 S | 6/1997 | Shindou .................. D14/138 |
| D383,130 S | 9/1997 | Waldner .................. D14/138 |
| D384,950 S | 10/1997 | Park ...................... D14/138 |
| D385,875 S | 11/1997 | Harris et al. ............. D14/138 |
| D385,876 S | 11/1997 | Park ...................... D14/138 |
| D386,188 S | 11/1997 | Park ...................... D14/250 |
| 5,799,068 A | * 8/1998 | Kikinis et al. ........... 379/93.06 |
| 5,832,371 A | * 11/1998 | Thornton .................. 455/90 |

OTHER PUBLICATIONS

*Computer User*, p. 17, (Dec. 1997).

"American Electromechanical Electronic Kits", *American Electromechanical Inc.*, http://www.aeiproducts.com/hold1.html, (1997).

"AT&T Introduces First Stand–Alone Telephone Answering System For Cordless Phones", *Business Wire*, (Nov. 16, 1994).

"Call Diverter", *VIVE Synergies Inc.*, http://www.vive.com-.vivesyn/catalog/p_cforw.htm, (1997).

"Call Diverter—SB1428A Multi–Media Modem", *Solwise Ltd.*, http://www.demon.co.uk/solwise/calldiv.htm.

"Call Editor RSA", *VIVE Synergies Inc.*, http://www.vive.com/vivesyn/catalog/p_cedrsa.htm, pp. 1–2, (1997).

"Called Id Information", *Clearwave Communications*, http://www.clearwave.com/callid.htm, (1993–1996).

"Caller ID: Northern Telecom Offers Consumer New Enhancements to Caller ID Family of Home Office & Residential Products", *EDGE*, 1–2, (Jan. 15, 1995).

(List continued on next page.)

Primary Examiner—Forester W. Isen
Assistant Examiner—Ramnandan Singh
(74) Attorney, Agent, or Firm—Schwegman, Lundberg, Woessner & Kluth, P.A.

(57) ABSTRACT

An electronic system such as a modular telephone which includes one or more module slots used to add features. The module slots are configured to receive modules adding the software and hardware necessary to provide the desired features.

15 Claims, 37 Drawing Sheets

OTHER PUBLICATIONS

"Chips: ISD Announces Shipment of its 25 millionth Chip to Panasonic for Innovative Cellular Phone Design; Chipcorder Technology Integrated into Cellular Phones to Enable "Voice Memo"Feature", *EDGE*, EDGE Publisher, (Jan. 15, 1996).

"Datacom—About TINA", *Datacom International*, (1997).

"Datacom Homepage", *Datacom International, Inc.*, (1997).

"Display telephone: Northern Telecom announces PowerTouch: a revolutionary new delivery vehicle for advanced display services", *EDGE*, 9(302), p. 21, (May 9, 1984).

"Grant Funded Research Projects", stephen@dcs.gla.ac.uk, (Dec. 3, 1997).

"InfoGear Technology Corporation: A New Form of Telecommunications", *Infogear Technology Corporation*, pp. 1–12.

"Intellect", *VIVE Synergies Inc.*, http://www.vive.com/vivesyn/catalog/intellect.htm, pp. 1–3, (1997).

"Intellect's Message Manager is your call control center!!", *Clearwave Communications, Inc.*, (1995).

"Modular in den Sommer", *Funkschau*, Abstract, (Jun. 6, 1997).

"New Phone: Lucent Technologies Introduces Digital Answering Speakerphone with Caller ID", *EDGE*, EDGE Publishing, (Apr. 22, 1996).

"New Phones: Siemens Introduces Global Digital Phone Family; Optiset E Phones Available in 120 Countries; Feature Groundbreaking Modularity, Ease of Use and Low Cost", *EDGE*, 1–3, (Jun. 16, 1997).

"Nortel (Northern Telecom) Brings Verifone's Verismart Consumer", *Northern Telecom Limited*, (Dec. 15, 1997).

"Nortel and Smartserv to cooperate on screen phone info services", *Advanced Intelligent Network News*, 6(8), Phillips Business Information, Inc., (Apr. 17, 1996).

"NORTEL: Nortel brings Verifone's Verismart Consumer smart card technology to PowerTouch screen telephone", *M2 Presswire*, (Dec. 16, 1997).

"NORTEL: Nortel's screen phone bring's electronic cash to homes in Guelph, Ontario", *M2 Presswire*, M2 Communications, (Feb. 17, 1997).

"Office features on Home Phones", *Communications Week*, (535), p. 27, (Dec. 12, 1994).

"Panasonic Analog Phones", *Tristate Telecom Inc.*

"Panasonic Digital Phones", *Tristate Telecom Inc.*

"Plug–and–Play Phone Systems Bow", *TMC Corp*, 1–2, (Dec. 18, 1995).

"Powertouch 350", *Nortel Northern Telecom*, http://www.nortel.com/entprods/phones/us/Ppt350.html.

"PowerTouch 350 ADSI Telephone", *Nortel Northern Telecom*.

"Ready–to–use Hardware To Automatically Link Your Telephone and PC", *Intellect, Clearwave Communications, Inc.*, http://www.clearwave.com/hardware.htm#ID–Link, 1–4, (1993–1996).

"SELF TALKER", *VIVE Synergies Inc.*, http://www.vive.com/vivesyn/catalog/selftalk.htm, (1997).

"SIEMENS: Best Selling Business Telephone System Now Offers Integrated Phone Directory for each Handset", *M2 Presswire*, (Mar. 5, 1997).

"Smart Receptionist", *VIVE Synergies Inc.*, http://www.vive.com/vivesyn/catalog/p_smrec.htm, pp. 1–6.

"Sprint Announces All–Singing All–Dancing Meridian 9516 Phone", *Computergram International*, No. 2547, Apt Data Services Ltd., (Nov. 18, 1994).

"TCBridge", *VIVE Synergies Inc*, http://www.vive.com/vivesyn/catalog/p_tcprid.htm, (1997).

"The Communication Systems for Small to Medium Sized Businesses", *Nortel Meridian NORSTAR Telephone Systems*.

"Unique Telecom Accessories—Part 1", *Mike Sandman*, http://www.sandman.com/accy.html, pp. 1–8, (1995).

"VoiceNet Internet Phone Connection", *Columbia Telecommunications Group, Inc.*, http://www.columbia–tel.com/voicenet.htm.

Schmitten, U., "Phones with built–in intuition", *Telecom Report International*, 18(4), 66–68, (Jul./Aug. 1995).

Wetli, P., "ADSI, Phones and Services face chicken–egg dilemma", *America's Network*, 99(4), p. 42(2), (Feb. 15, 1995).

* cited by examiner

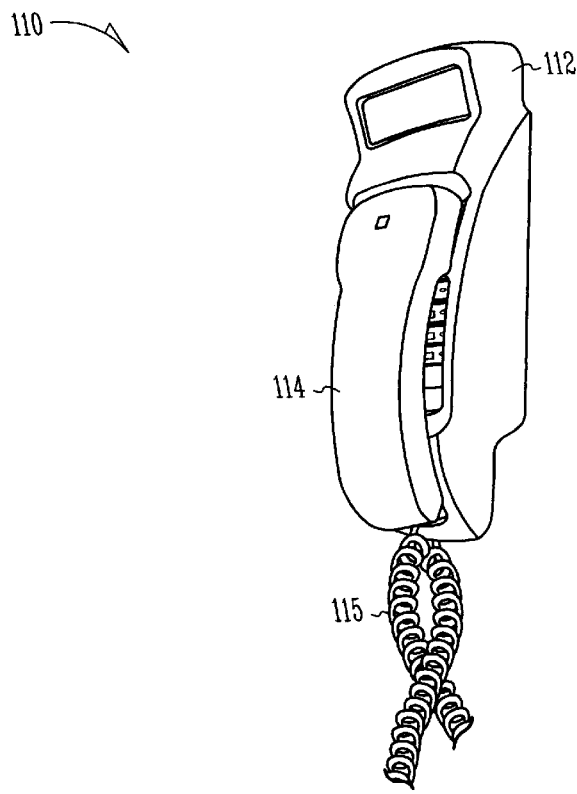
Fig.9B
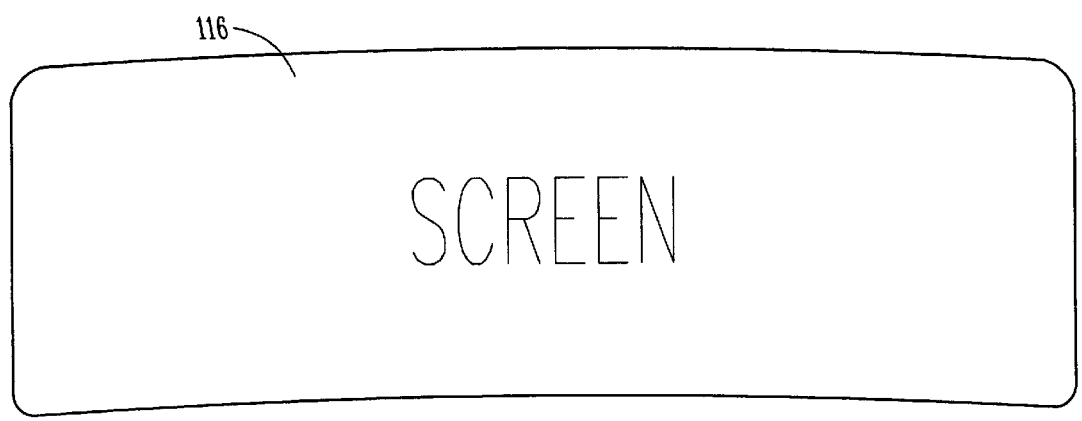
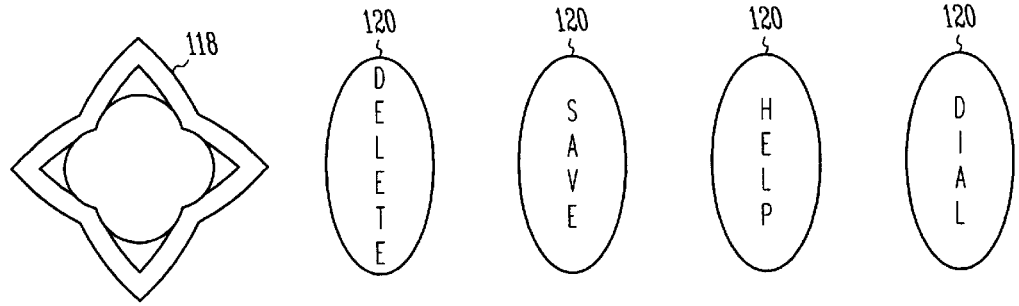
Fig.9C

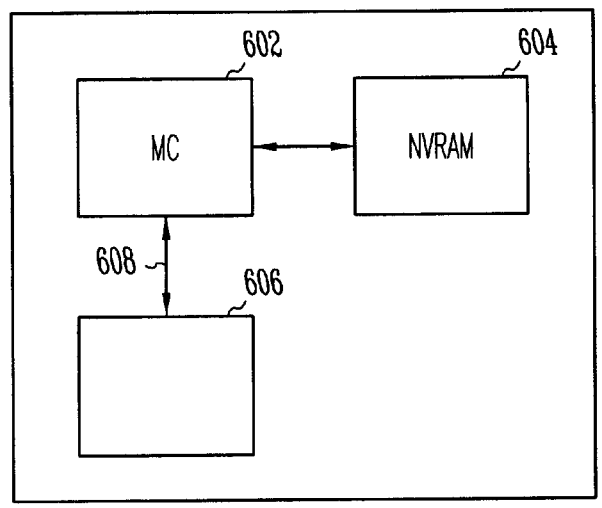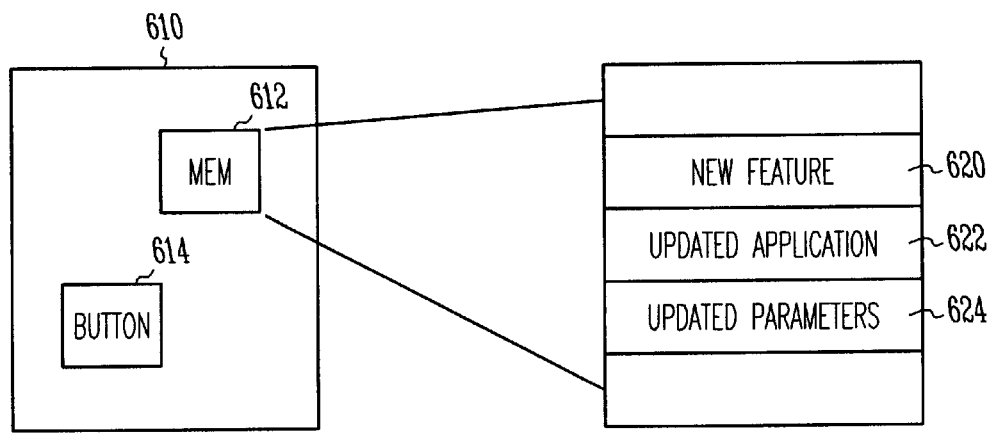
Fig.27

MODULAR TELEPHONE

BACKGROUND OF THE INVENTION

1. Field of the Invention

The present invention is related to telephony, and more particularly to a system and method for selectively adding features to a telephone.

2. Background Information

With the availability of sophisticated processing technology, there has been an explosive growth in the variety of features offered in standard telephones. Even the most inexpensive telephones include features such as redial, while more expensive models include such amenities as speed dial, caller identification (caller ID) and digital answering machines.

To date, the options for upgrading your existing telephone were limited. One could, for instance, add a separate answering machine or a separate caller ID unit to the existing telephone. Such an approach is unappealing, however, due to the increased clutter. Another option is to discard the existing telephone and replace it with a new telephone having the desired features. Such an approach is wasteful of money and may be harmful to the environment.

What is needed is a system and method for adding features to an existing telephone.

SUMMARY OF THE INVENTION

According to one aspect of the present invention, a modular telephone is described which includes one or more module slots. The module slots are configured to receive modules adding features to the modular telephone.

According to one such aspect of the present invention, a module slot includes circuitry which reads application code or other information stored in a module installed in the module slot.

According to yet another aspect of the present invention, a module can be used to install a new feature in an electronic system having a module interface designed to receive a module having memory. The module also includes an enclosure and a connector mounted in the enclosure and configured to connect to the module connection when the enclosure is placed in proximity to the electronic system. The memory includes a plurality of memory locations. One or more of the plurality of memory connections contains information specific to the feature being installed.

According to yet another aspect of the present invention, a method of installing a new feature in an electronic system is described. An enclosure is provided and memory and a user interface are installed in the enclosure. Information relevant to the new feature into the memory installed in the enclosure is stored into the memory and subsequently transferred to the electronic system. The feature is then controlled via the user interface.

According to yet another aspect of the present invention, a method of installing a new feature in an electronic system is described. An enclosure is provided and memory is installed in the enclosure. Information relevant to the new feature into the memory installed in the enclosure is stored into the memory and subsequently transferred to the electronic system. In addition, operating system code stored in the memory is transferred to memory in the electronic system and used to upgrade the operating system of the electronic system.

According to yet another aspect of the present invention, a peripheral device is described which operates in conjunction with a telephone to add telephone features to the telephone. The peripheral device includes one or more module slots, a processing unit and a telephone interface which operate in cooperation with the processing unit to provide a new feature based on information read from a module installed in one of the module slots. Each module slot is configured to receive a module adding features to the telephone. The telephone module includes a relay for disconnecting the telephone from a central office.

According to yet another aspect of the present invention, a numeric data entry device is described which operates under a first method to transfer information over a telephone connection and which operates under a second method to transfer information to a microprocessor, the data entry device comprising a keypad and a dual tone multiple frequency (DTMF) disable feature for disabling DTMF tones while permitting transfer of data from the keypad to the microprocessor.

According to yet another aspect of the present invention, a distinctive ring system and method is described. Data representative of a plurality of distinctive incoming call signals is stored in memory. One or more of the distinctive incoming call signals are associated with caller identifiers (e.g., caller IDs or user keyed or biometric information), wherein associating includes associating a first distinctive incoming call signal with a first caller identifier. A first caller identifier is received and the data is accessed as a function of the first caller identifier. The first distinctive incoming call signal is then generated from the accessed data.

According to yet another aspect of the present invention, a system and method diverting a telephone call is described. Data representative of a plurality of messages is stored in memory and one or more of the messages are associated with caller identifiers (e.g., caller IDs or user keyed or biometric information). A signal including the first caller identifier is received and the data is accessed as a function of the first caller identifier. Finally, the first message is played.

According to yet another aspect of the present invention, a system and method diverting a telephone call is described. Data representative of a plurality of messages is stored in memory and one or more of the messages are associated with caller identifiers (e.g., caller IDs or user keyed or biometric information). A signal including the first caller identifier is received and, if an expected security code is received, the data is accessed as a function of the first caller identifier and the first message is played.

According to yet another aspect of the present invention, a system and method diverting a telephone call is described. Data representative of a plurality of telephone numbers is stored in memory and one or more of the telephone numbers are associated with caller identifiers (e.g., caller IDs or user keyed or biometric information). A signal including the first caller identifier is received and the data is accessed as a function of the first caller identifier. The call is then transferred to the first telephone number.

According to yet another aspect of the present invention, a system and method diverting a telephone call is described. Data representative of a plurality of telephone numbers is stored in memory and one or more of the telephone numbers are associated with caller identifiers. A signal including the first caller identifier is received and, if an expected security code is received, the data is accessed as a function of the first caller identifier. The call is then transferred to the first telephone number.

According to yet another aspect of the present invention, a system and method of speed dialing an area code is described. Data representative of a plurality of area codes is stored in memory. Each of the plurality of the area codes is associated with a button, wherein associating includes associating a first area code with a button. The first button is depressed and a signal representative of the first area code is driven on the telephone line.

According to yet another aspect of the present invention, a system and method of speed dialing a telephone number is described. Data representative of a plurality of telephone numbers is stored in memory. When a string of numbers is entered, the string of numbers is compared against the telephone numbers stored in memory. A list of telephone numbers which match the string of numbers is displayed and a selected one of the listed numbers is then dialed.

BRIEF DESCRIPTION OF THE DRAWINGS

FIGS. 9a–9c illustrate another embodiment of modular telephone system 10;

FIG. 11b illustrates one embodiment of the peripheral device of FIG. 11a;

FIG. 27 illustrates an electronic system which uses modules to add features to the system.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention. Like reference numbers refer to similar items in all the figures.

Figure 1:
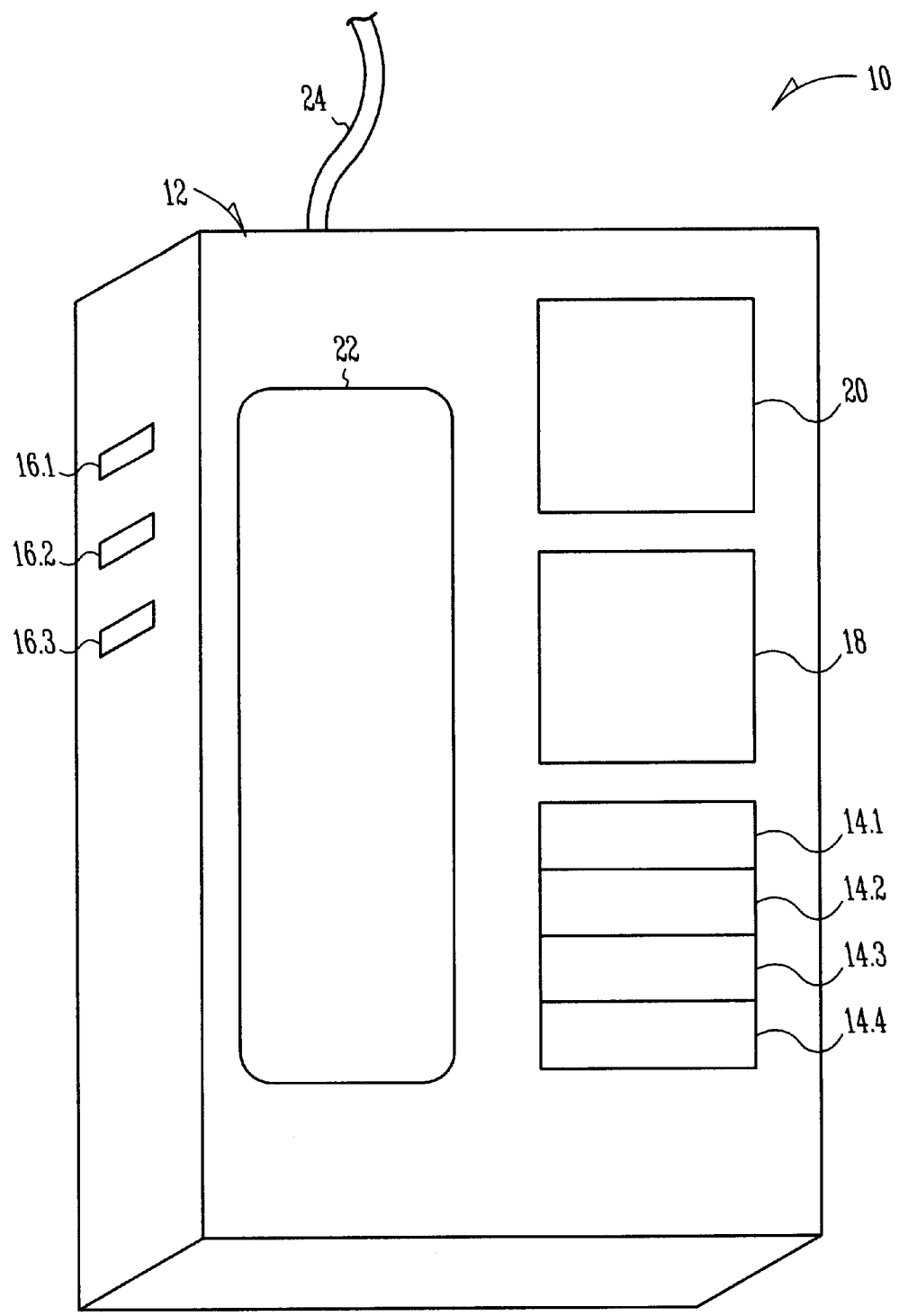
FIG. 1 illustrates an embodiment of modular telephone system 10.

A modular telephone system 10 is shown generally in FIG. 1. In FIG. 1, modular telephone system 10 includes a base unit 12 with four module slots 14 (shown as 14.1–14.4) on the top side of base unit 12 and three module slots 16 (shown as 16.1–16.3) on the left side of base unit 12. Each module slot 14, 16 is configured to receive a module (not shown) capable of adding features to modular telephone system 10. System 10 also includes telephone circuitry (not shown) connected to a data entry device 18, a display 20, a handset 22 and a telephone system interface 24.

In one embodiment, telephone system interface 24 connects to a network using standards such as, e.g., POTS and ISDN. In one such embodiment, as is shown in FIG. 1, telephone system interface 24 is connected to the back side of base unit 12.

Figure 2:
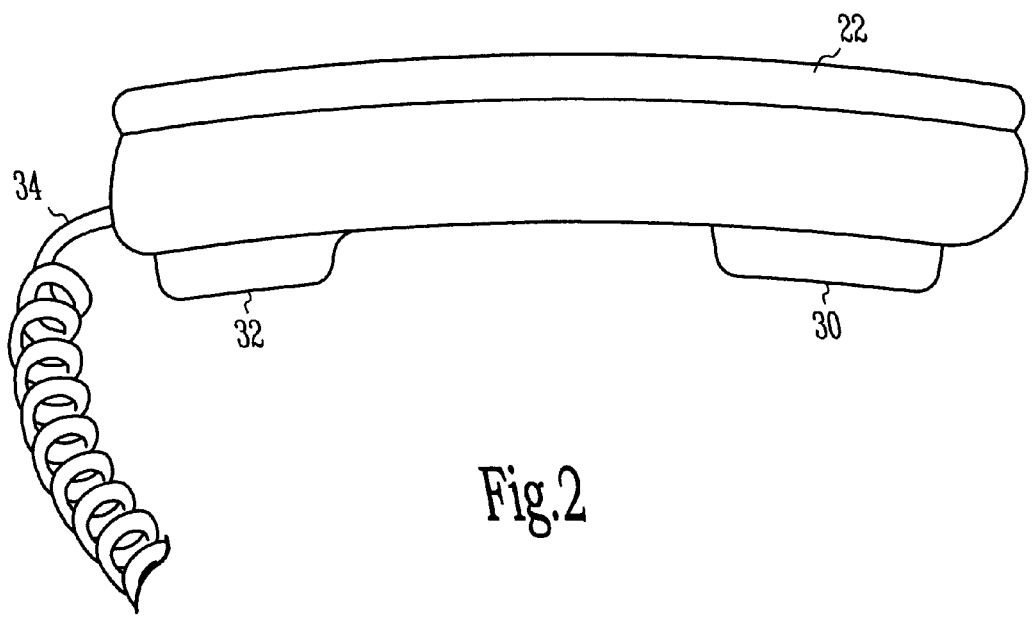
FIG. 2 illustrates a handset which can be used with modular telephone system 10 of FIG. 1.

In one embodiment, as is illustrated in FIG. 2, handset 22 includes a receiver 30, a microphone 32 and a cord 34 connecting handset 22 to base unit 12. In another embodiment, handset 22 is connected to base unit 12 using an RF, acoustic, optical, infrared or other electromagnetic signal.

Figure 3A:
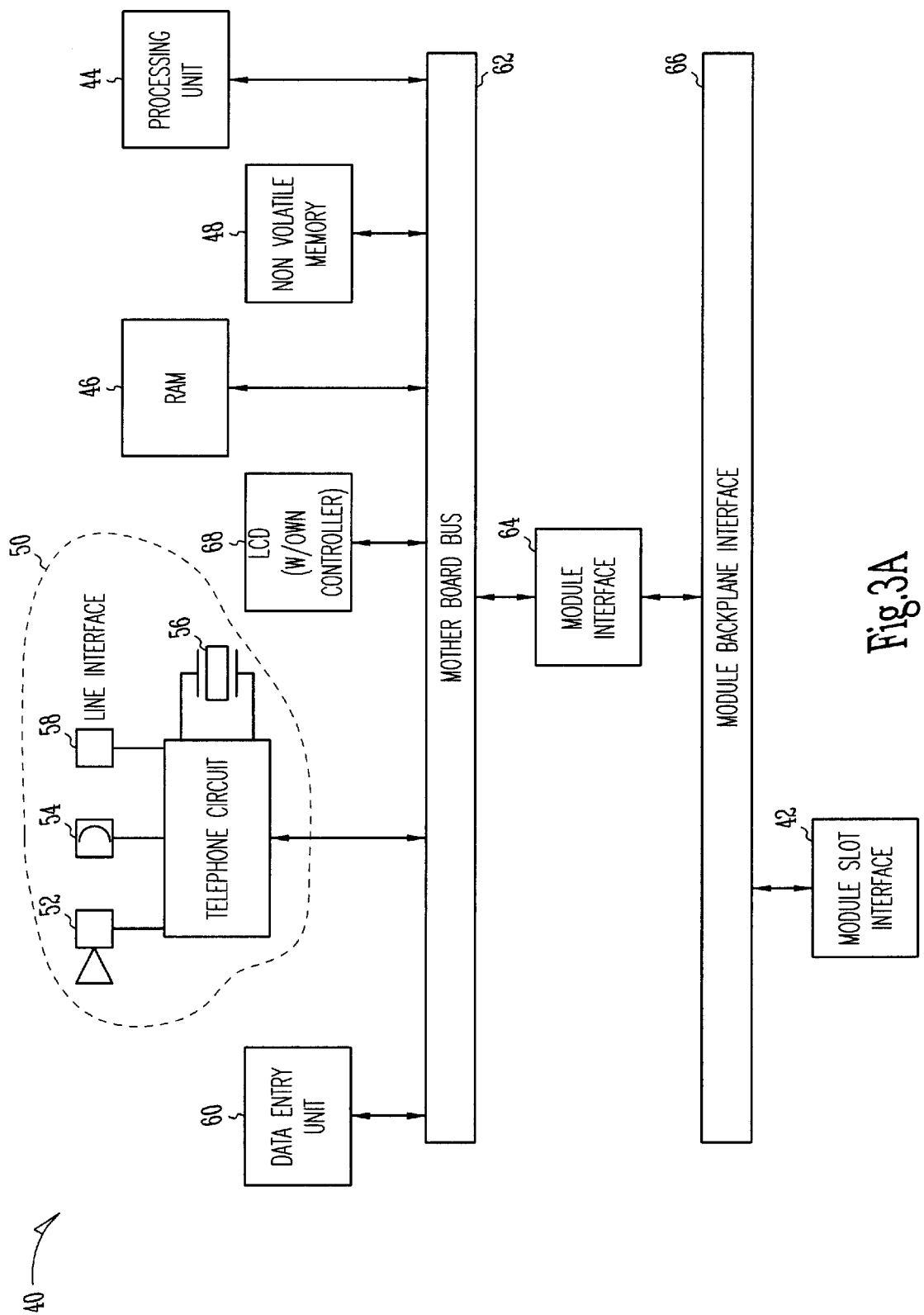
FIGS. 3a and 3b illustrate alternate embodiments of a circuit 40 which can be used with telephone system 10 of FIG. 1.
Figure 3B:
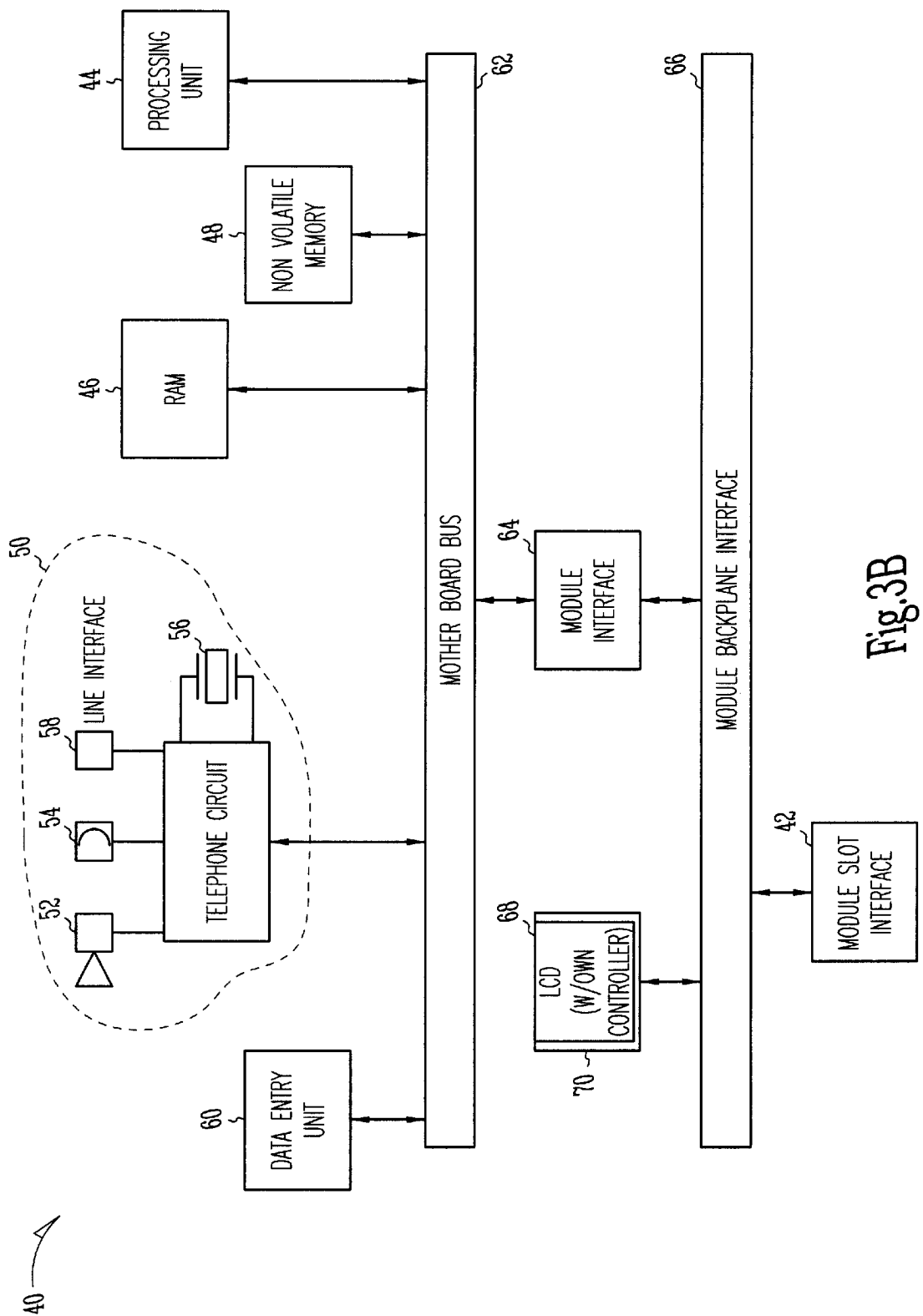

FIGS. 3a and 3b illustrate alternate embodiments of a base unit subsystem 40 which can be used with telephone system 10 of FIG. 1. In one embodiment, subsystem 40 includes telephone subsystem 50, memory 46, nonvolatile memory 48, processing unit (CPU) 44, data entry unit 60 and one or more module slot interfaces 42. In one such embodiment a display unit 68 is also included to provide feedback to the user. Display unit 68 may be formed as a LED, LCD, video or other such display device. In one embodiment, display unit 68 is a LCD display capable of displaying the current data and time as well as several lines of information.

In one embodiment, telephone subsystem 50 includes circuitry needed to form a basic POTS telephone. In another embodiment, telephone subsystem 50 is designed to connect to a PBX system.

Telephone subsystem 50 includes microphone input 54, speaker output 52, line interface circuitry 58 and sound source 56. Sound source 56 may be, for example, a piezo sound element, a speaker, or any other sound source. Line interface 58 can be connected to a telephone interface 24, such as is shown in FIG. 1. In one embodiment, telephone subsystem 50 and processing unit 44 are implemented using integrated circuit devices in the manner known to those skilled in the telecommunications art. In another embodiment, substantial portions of telephone subsystem 50 and processing unit 44 are formed using a single, suitably programmed, integrated circuit (e.g., a digital signal processing device, microprocessor or microcontroller).

In one embodiment, data entry unit 60 is a keypad. It should be apparent that a data entry system such as a mouse, pointer or stylus or any other known techniques for data entry in graphical or text environment could be used. In one such embodiment, data entry unit 60 and display unit 68 are combined into a touch screen. In another embodiment, soft keys are shown on display unit 68. In such an embodiment, data entry unit 60 may simply be a set of buttons corresponding to the soft keys displayed on display unit 68. Each button is associated with one of the soft keys displayed by display unit 68; telephone subsystem 50 and processing unit 44 operate in conjunction with display unit 68, as needed, to translate a touch on a button into the activity displayed by its associated soft key.

In one embodiment, a module adding new features to system 10 is connected through a module slot 14 or 16 to a module slot interface 42. In one such embodiment, processing unit 44 operates in cooperation with module slot interface 42 to read information from a module installed in one of the module slots into memory 46. In the example shown in FIGS. 3a and 3b, processing unit 44 is connected to module slot interface 42 over mother board bus 62, module interface 64 and module backplane interface 66. In one set of embodiments, module backplane interface 66 is a standard interface such as PC/104, USB or PCMCIA. Other methods of connecting the components of circuit 40 will be readily envisioned by one skilled in the art of telecommunications or data processing.

FIG. 3b illustrates an embodiment of subsystem 40 where display unit 68 is housed in a separate display module 70. In one such embodiment, display unit 68 and other circuitry aboard module 70, when plugged into its respective module slot 14, are connected to processing unit 44 and telephone circuit 51 over mother board bus 62, module backplane interface 64 and module backplane 66. In another such embodiment, module 70 is connected directly to module backplane interface 66 and, through module interface 64, to mother board bus 62.

Figure 4A:
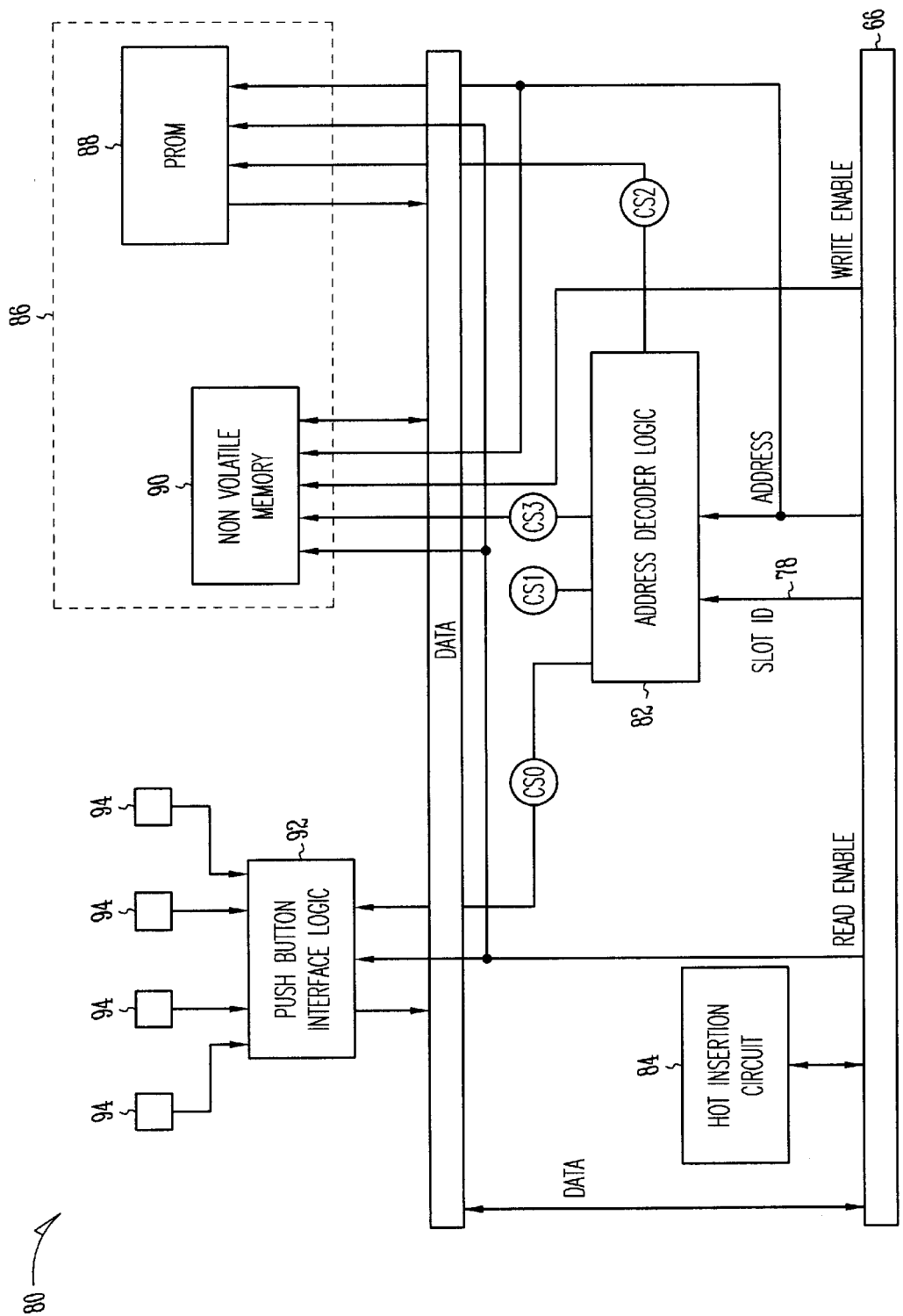
FIGS. 4a and 4b illustrate alternate embodiments of a module which can be used in modular telephone system 10.
Figure 4B:
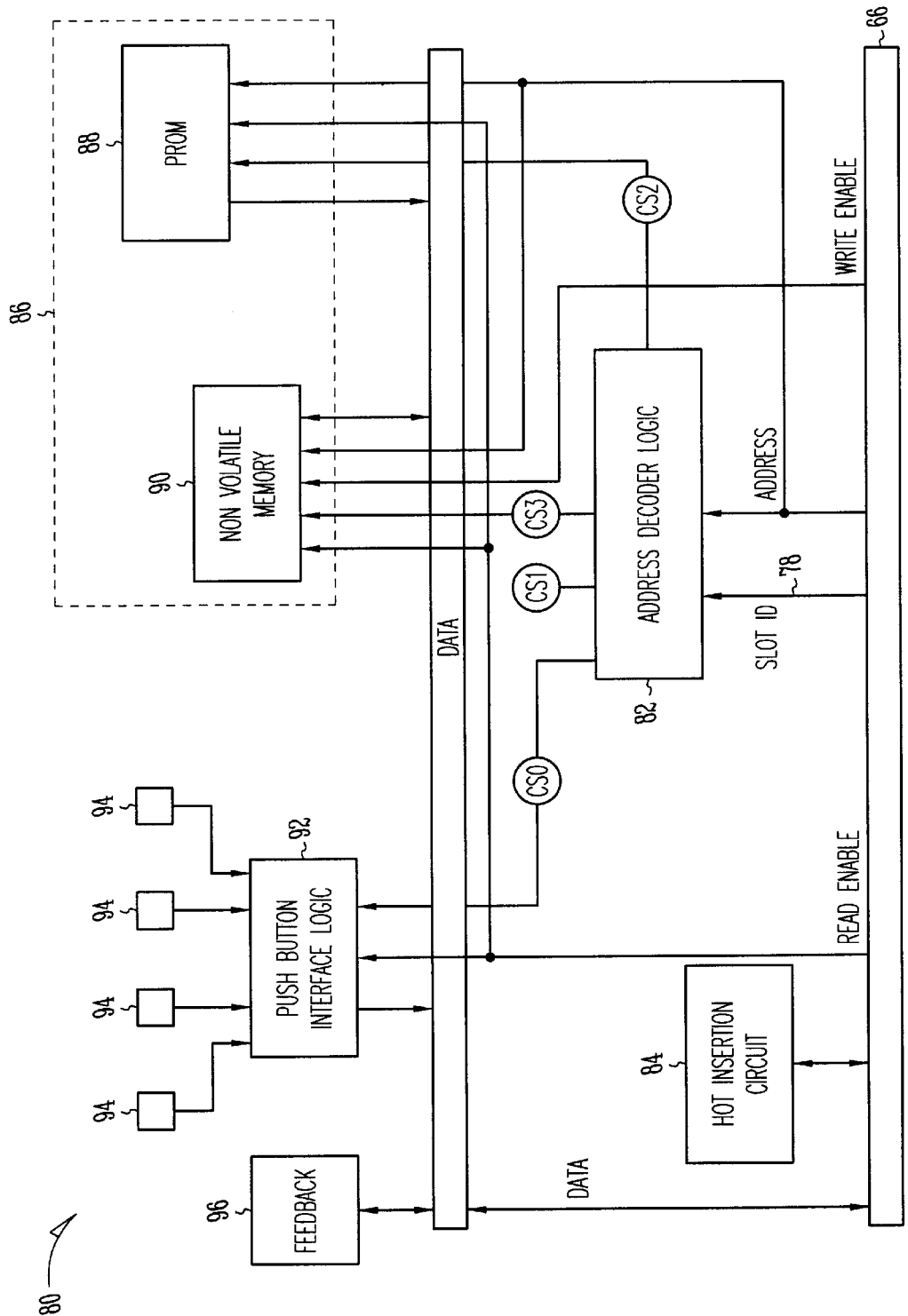

FIGS. 4a and 4b illustrates two embodiments of a generic module 80 which can be used in modular telephone system 10 of FIG. 1. In the embodiments shown in FIGS. 4a and 4b, each module 80 is address independent and capable of being inserted into a powered-up base unit subsystem 40 (i.e., it is hot insertion capable). In one such embodiment, module 80 includes address decoder logic 82, hot insertion circuitry 84 and memory 86.

In one embodiment of the modules 80 shown in FIGS. 4a and 4b, address decoder logic 82 includes one or more slot ID inputs 78 used to identify the module slot (14, 16) into which module 80 is inserted. For instance, in one embodiment, address decoder logic 82 accepts a three or four bit slot ID from slot ID inputs 78. The slot ID is a binary value that is unique to each slot in the backplane, and acts as the most significant (MS) bits of the backplane address bus. In one embodiment, when the three or four most significant bits of the address match the slot ID, processing unit 44 is addressing the module. Data is then read from memory 86 as a function of the appropriate number of least significant bits on the address bus. Chip selects are generated as needed within module 80 to access particular memory devices within memory 86. In addition, address decoding may be used to query the status of various other elements within module 80 (such as button interface 92 or self test logic, if any). In one such embodiment, I/O and memory space are designed to be uniform across all modules. (Of course, not all chip selects will be used on every module.)

Memory 86 may include both volatile and nonvolatile memory. In addition, memory 86 may include two or more types of nonvolatile memory. In one embodiment, memory 86 includes a read-only memory 88 (e.g., PROM or ROM) and nonvolatile memory 90 (e.g., FLASH memory, EEPROM, magnetic or optical media). Read-only memory 88 is used to store data and application information which is unlikely to change. Nonvolatile memory 90 may be used, if necessary, to store data and application code which may be upgraded. In one embodiment, nonvolatile memory 90 is FLASH or electrically-erasable memory and module 80 includes circuitry for reprogramming memory 90. Such an embodiment is useful for making quick revisions to the application stored in module 80.

In one embodiment read-only memory 88 is an EPROM which contains all of the program code needed by processing unit 44 to implement a particular feature. In addition, memory 88 stores a serial number, security code, and version number associated with the particular feature being added to system 10.

Nonvolatile memory 90 is optional. If present, it is used to store user-defined data such as telephone numbers. If, however, memory 90 is too expensive to put on individual modules, the information can be stored by CPU 44 in centralized nonvolatile memory 48.

Returning to FIG. 4a, in one embodiment module 80 includes a push button interface 92 and one or more externally mounted buttons 94. In such an embodiment, push button interface 92 debounces the mechanical switch contacts of buttons 94, generates an interrupt to the CPU when a pushbutton is pressed, and captures the switch states (pressed/not pressed) in a register. That register can then be queried by processor 44 by reading at a predefined address (as is detailed above).

In one embodiment hot-insertion circuitry 84 controls power sequencing on module 80 when module 80 is inserted or removed from system 10. This is done to prevent damage to electronic devices when then are first connected to the system 10 power supply.

In one embodiment, such as is shown in FIG. 4b, module 80 includes a feedback mechanism 96 used to give the user an indication of operation of module 80. Feedback mechanism could include visual (e.g., flashing LED), aural (e.g., beeper or tone generator) or tactile (e.g., vibrator) forms of feedback. In one visual feedback embodiment, feedback mechanism 96 includes a flashing LED circuit which is enabled and disabled by the processing unit 44 writing to a single bit register. Flashing is controlled by feedback mechanism 96, i.e., the processing unit 44 does not have to "manually" turn the LED on and off at some interval. Other bits of data at the same address could be used to make the flashing circuit programmable (e.g., variable flash rate, flash/always on, etc.).

In one embodiment, pushbutton interface 92, feedback mechanism 96, address decoder logic 82 and any necessary bus buffers are combined into a single physical device for cost reduction. Such a device can be formed from an ASIC, FPGA or PLD.

Figure 5:
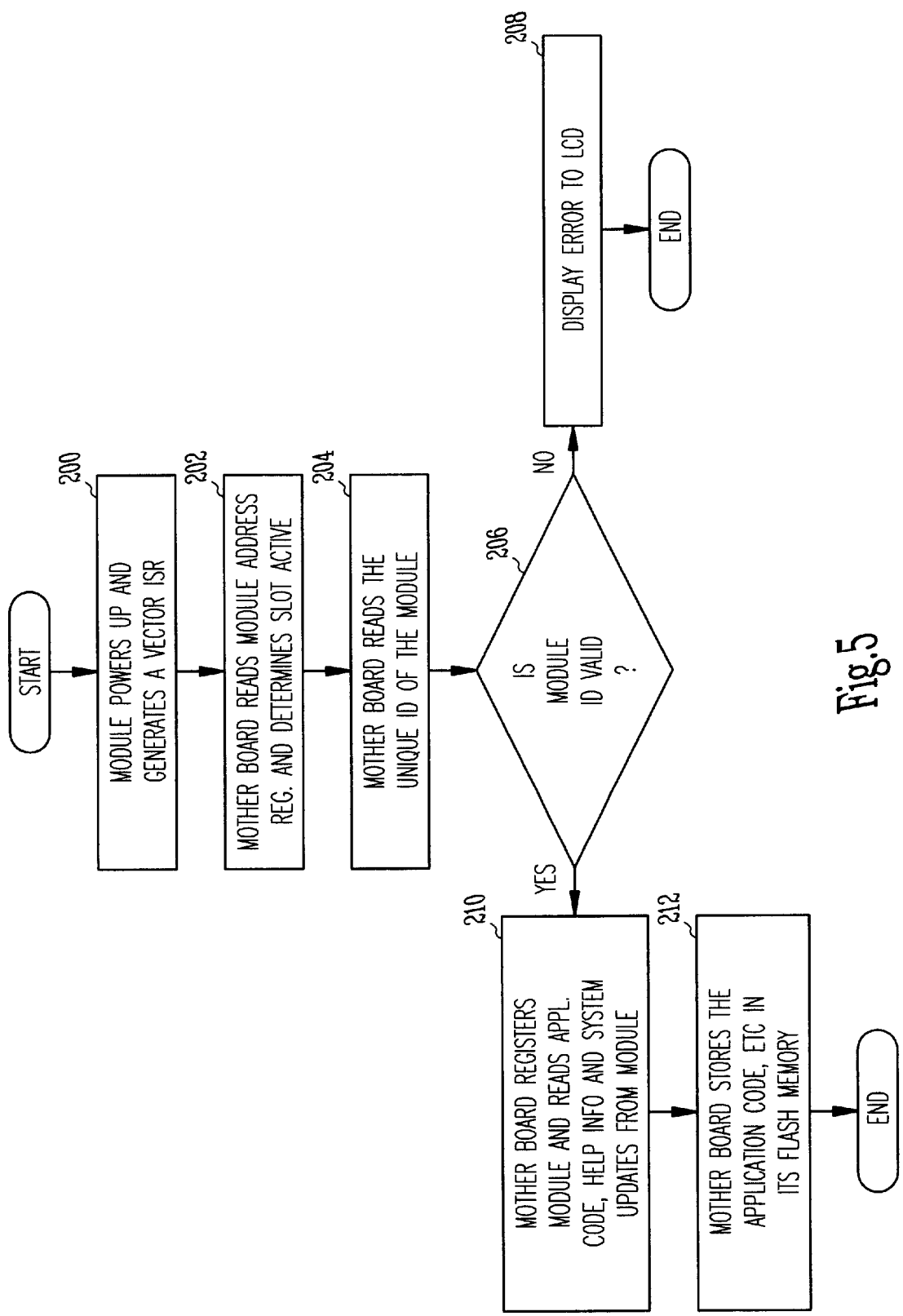
FIG. 5 illustrates a vector interrupt service routine which can be used to transfer data from a module to the base unit on power up.

In operation, processing unit 44 reads application code and configuration information from memory 86 and stores the relevant data in RAM 46. Processing unit 44 executes the application code out of RAM 46 to provide the desired feature. FIG. 5 illustrates one embodiment of a routine used to transfer data from module 80 to processing unit 44.

At 200, module 80 powers up and generates a vector interrupt service routine (ISR). Processing unit 44 reads the module address register at 202 to determine which module slot 14 or 16 was made active. At 204, processing unit 44 reads a unique identifier stored in module 80 and determines at 206 whether the module is a valid module. If the module is not a valid module, processing unit 44 displays an error message on display 68 at 208.

If the module is, however, a valid module, processing unit 44 moves to 210 and reads application code and help information from module 80. At 212 the application code and help information are stored into nonvolatile memory 48 for subsequent access by processing unit 44.

In some embodiments, updates to code stored in memory 48 of subsystem 40 are read from module 80 at 210 when that module is first powered up. The information is then stored to memory 48. Such an approach can be used to provide updates to system 10 at the time new features are added. In one such embodiment, processing unit 44 queries a newly added module to determine if it has a newer version of the operating system than that already installed in system 10. If so, the newer version is transferred to memory 48 and installed. In such an embodiment, each module may contain a version of the operating system and system parameters; processing unit 44 tracks the versions stored on each module and only updates memory 44 if it detects a newer version.

In another embodiment, new versions of the operating system and any system parameters are downloaded through telephone system interface 24 (e.g., through a bulletin board or 800 number accessed through the POTS network. In one such embodiment, circuitry necessary to provide caller ID in subsystem 50 is upgraded to full modem capability. The modem connects to, for instance, the bulletin board, checks for newer versions of application code and downloads that code to memory 48. In one such embodiment, nonvolatile memory 90 in module 80 is updated to the latest revision of its own application code via this process.

Figure 6A:
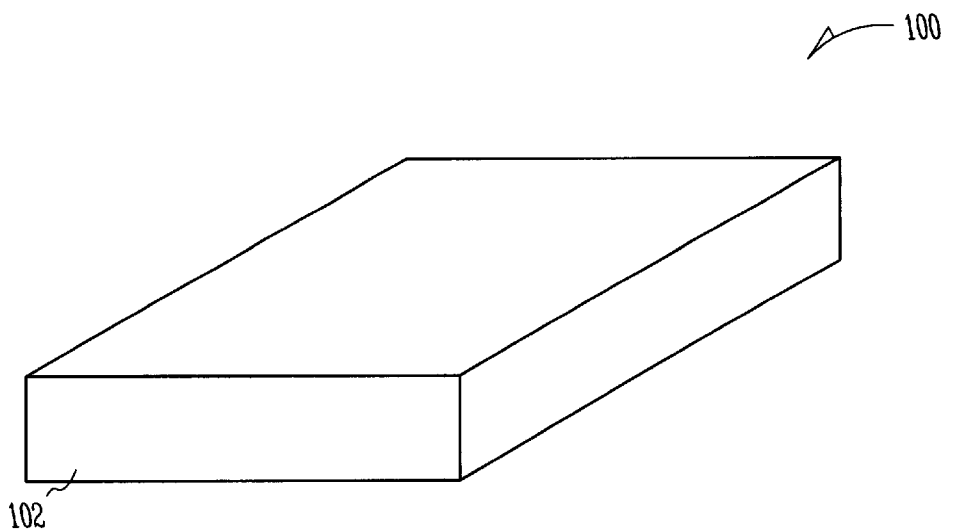
FIGS. 6a–6c illustrate selected embodiments of packaging used for the modules of system 10.
Figure 6B:
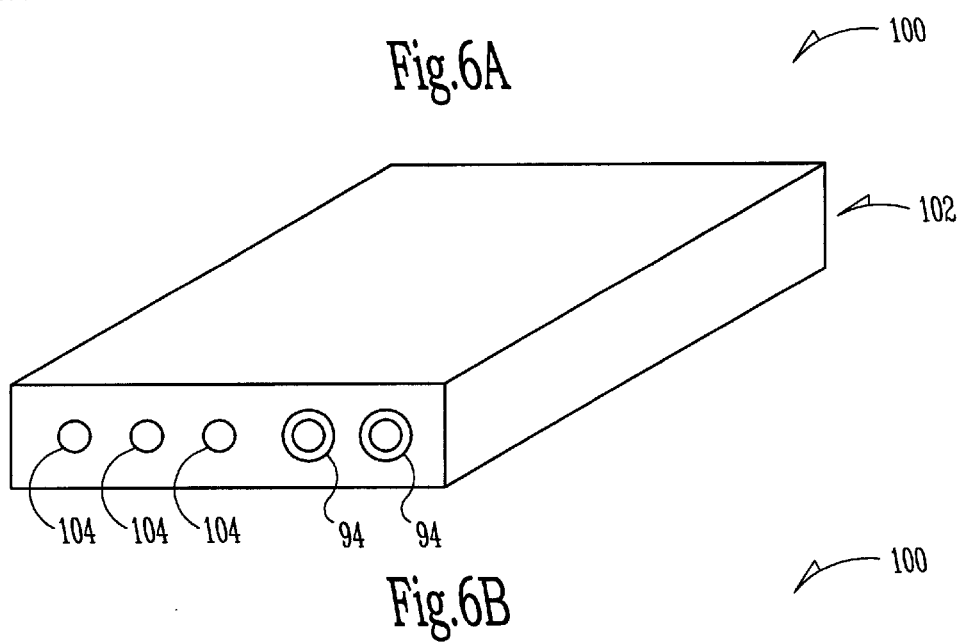
Figure 6C:
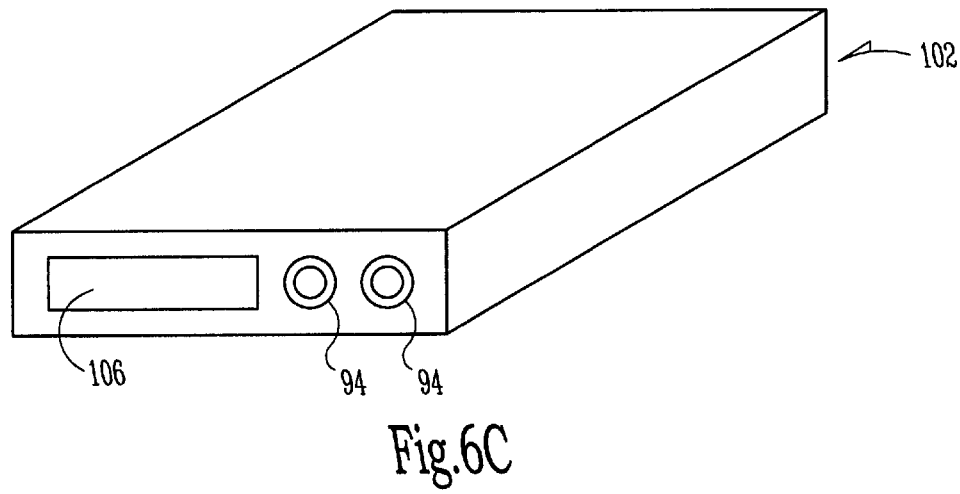

FIGS. 6a–c illustrate selected embodiments of packaging used for modules 80. In the simplest embodiment, such as is shown in FIG. 6a, module 80 is packaged in an approximately rectangular package 100 such as a PCMCIA package. A connector 102 is plugged into slot interface 42 to add the feature provided by module 80.

FIG. 6b illustrates a package 100 having two push buttons 94 and three visual indicators 104 (e.g., LEDs). In one embodiment, a user accesses certain aspects of the added feature by depressing one or both of the push buttons 94. Visual indicators 104 provide feedback that some action is indeed taking place. In the embodiment shown in FIG. 6b, connector 102 is at the opposite end of the package from push buttons 94.

FIG. 6c illustrates a package 100 having two push buttons 94 and a single display element 106 (e.g., an LCD). As in the embodiment shown in FIG. 6b, in this embodiment a user accesses certain aspects of the added feature by depressing one or both of the push buttons 94. Text or graphical information displayed in display element 106 provides feedback that some action is indeed taking place. (For example, the ID of an incoming caller could be displayed in display element 106.)

Figure 7:
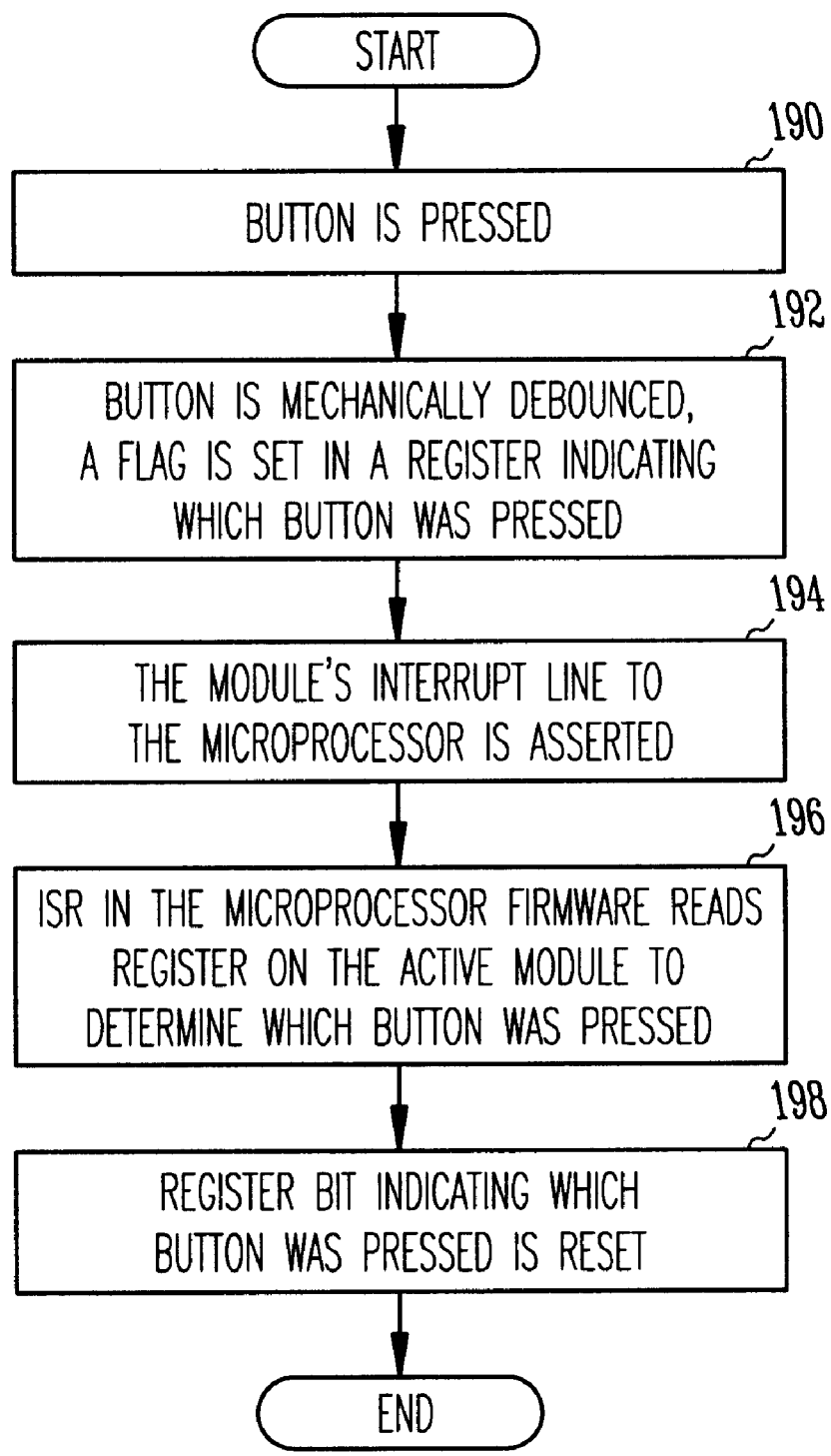
FIG. 7 illustrates a button service routine which can be used to service buttons mounted on either the base unit or the modules.

A button service routine which can be used to process any of the buttons base unit 40 or in module 80 is shown in FIG. 7. In FIG. 7, at 190 a button is depressed. The button is mechanically debounced and, at 192, a flag is set in a register in logic 92 identifying the button depressed. Module 80 then, at 194, generates an interrupt to CPU 44. At 196, an interrupt service routine in CPU 44 reads the register on module 80 to determine which button was pressed and, at 198, the register flag is reset.

Figure 8:
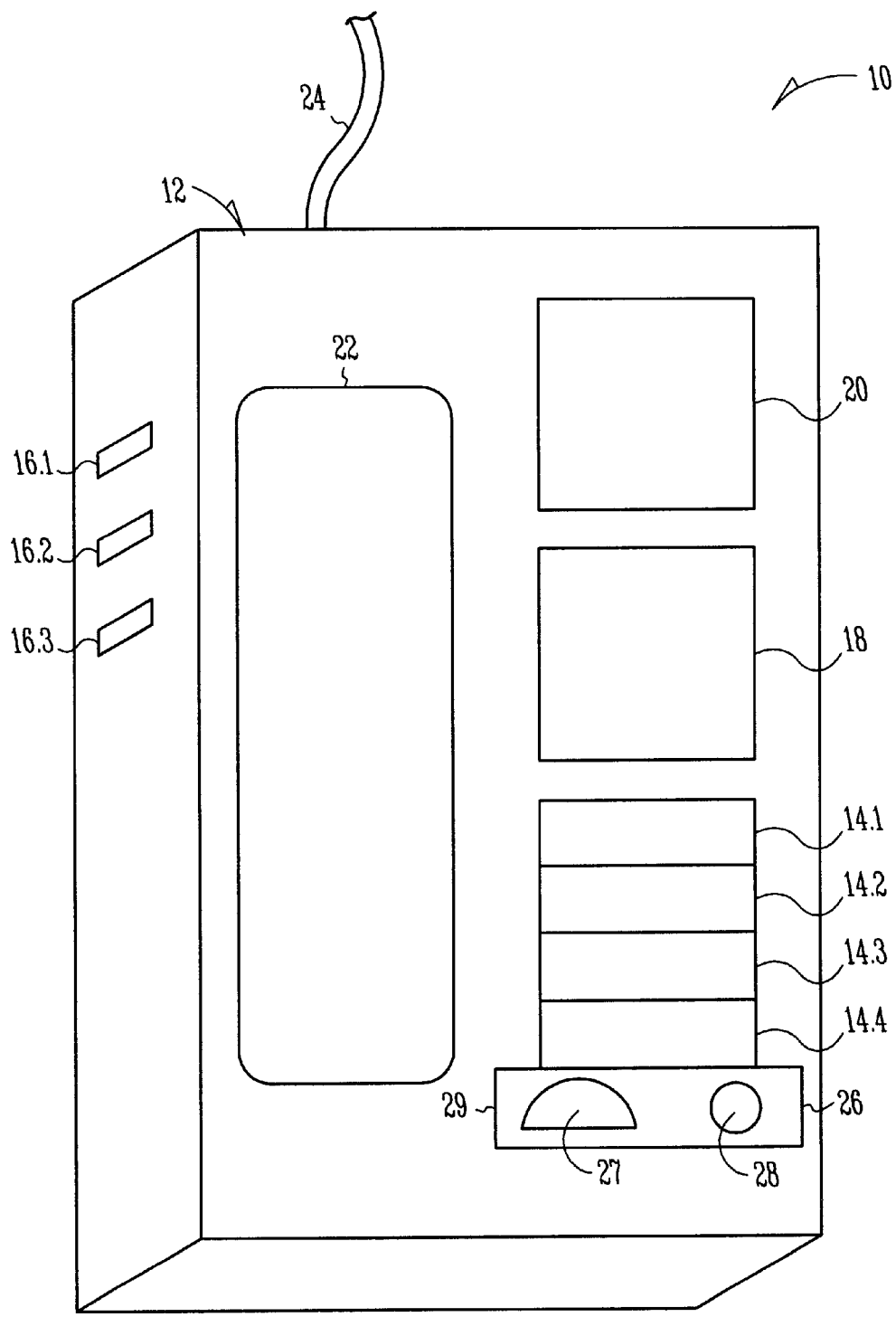
FIG. 8 illustrates another embodiment of modular telephone system 10.

In one embodiment, base unit 12 further includes a speaker phone interface 26. In one such embodiment, speaker phone interface 26 includes a speaker 27 and a microphone 28 mounted permanently within base unit 12. In another such embodiment, speaker phone interface 26 is placed within a special module which can be inserted and removed from base unit 12. One example of such an embodiment is shown in FIG. 8. By placing speaker phone interface 26 in a module one can upgrade the speaker phone capabilities of speaker phone interface 26 (e.g., with better speaker or microphone technology, or with increased functionality) without having to replace the telephone.

In one such module-based speaker phone embodiment, base unit 12 includes a speaker phone module slot 29 for receiving the special speaker phone interface module. Connection to the speaker phone may be made through an analog connection or digitally via address decoder logic 82 as shown in FIG. 4. Data to be transmitted and received from the digital speaker phone interface module is digitized and placed within the address space allocated to the module.

Figure 9A:
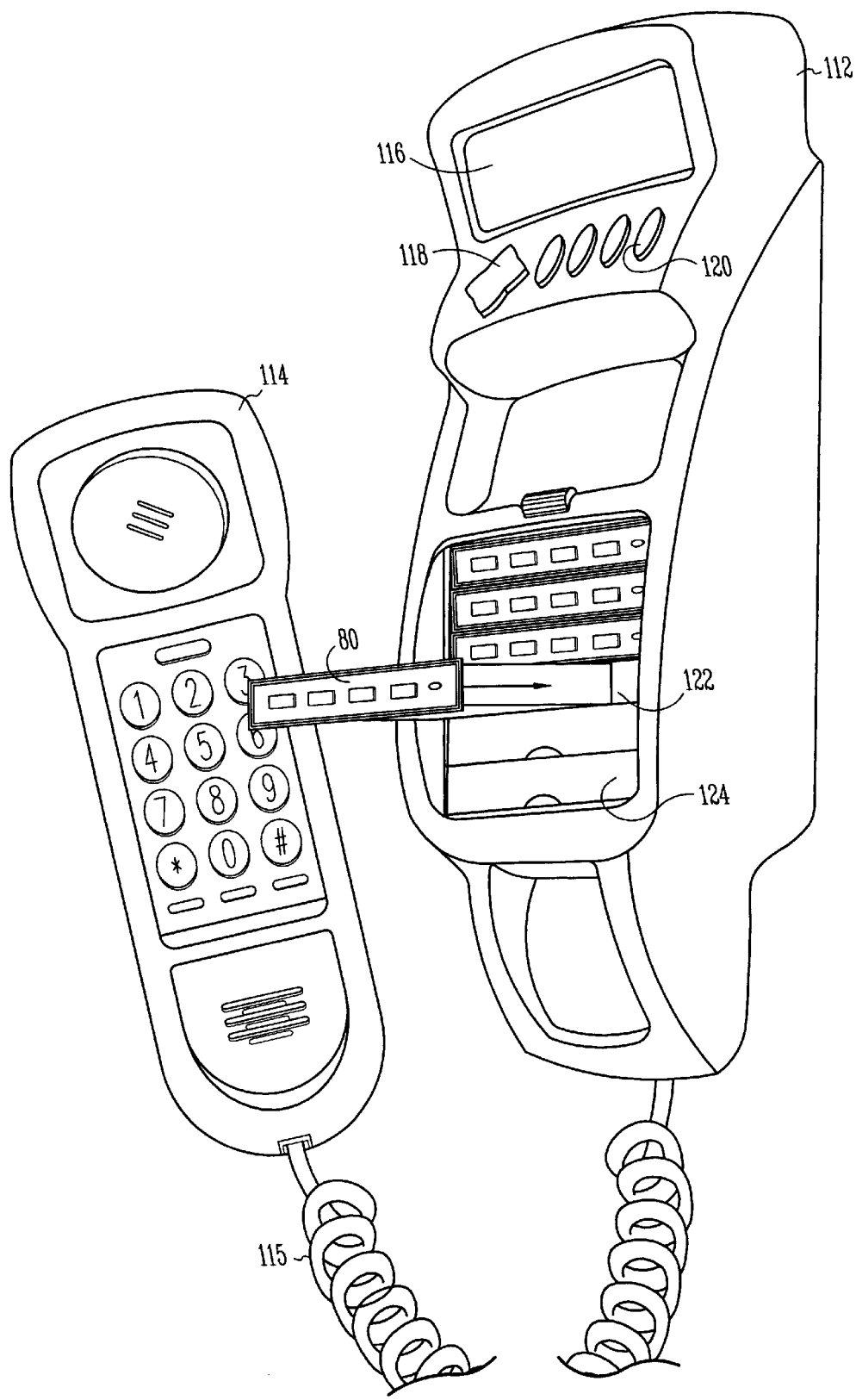

Modular telephone system 10 can be packaged in a number of ways. A wall-mounted embodiment of system 10 is shown in FIGS. 8a–8c. In the embodiment shown in FIGS. 9a–9d, telephone system 110 includes a base unit 112 and a handset 114. Handset 114 is connected to base unit 112 through a cord 115 as shown in FIGS. 9a–9c and contains the keypad, speaker and microphone of a typical wall-mounted unit. In another embodiment, handset 114 is connected to base unit 112 through an RF or optical interface.

Base unit 112 includes a display screen 116, a switch 118, one or more buttons 120 and one or more module slots 122. Module slots 122 are configured to receive modules 80. Module slots not in use are covered with a plate 124. Buttons 120 may have predefined functions (such as shown in FIG. 9c) or may be soft keys whose function change in response to what is displayed on screen 116. In one embodiment, information displayed on screen 116 is scrolled through using switch 118.

Figure 10:
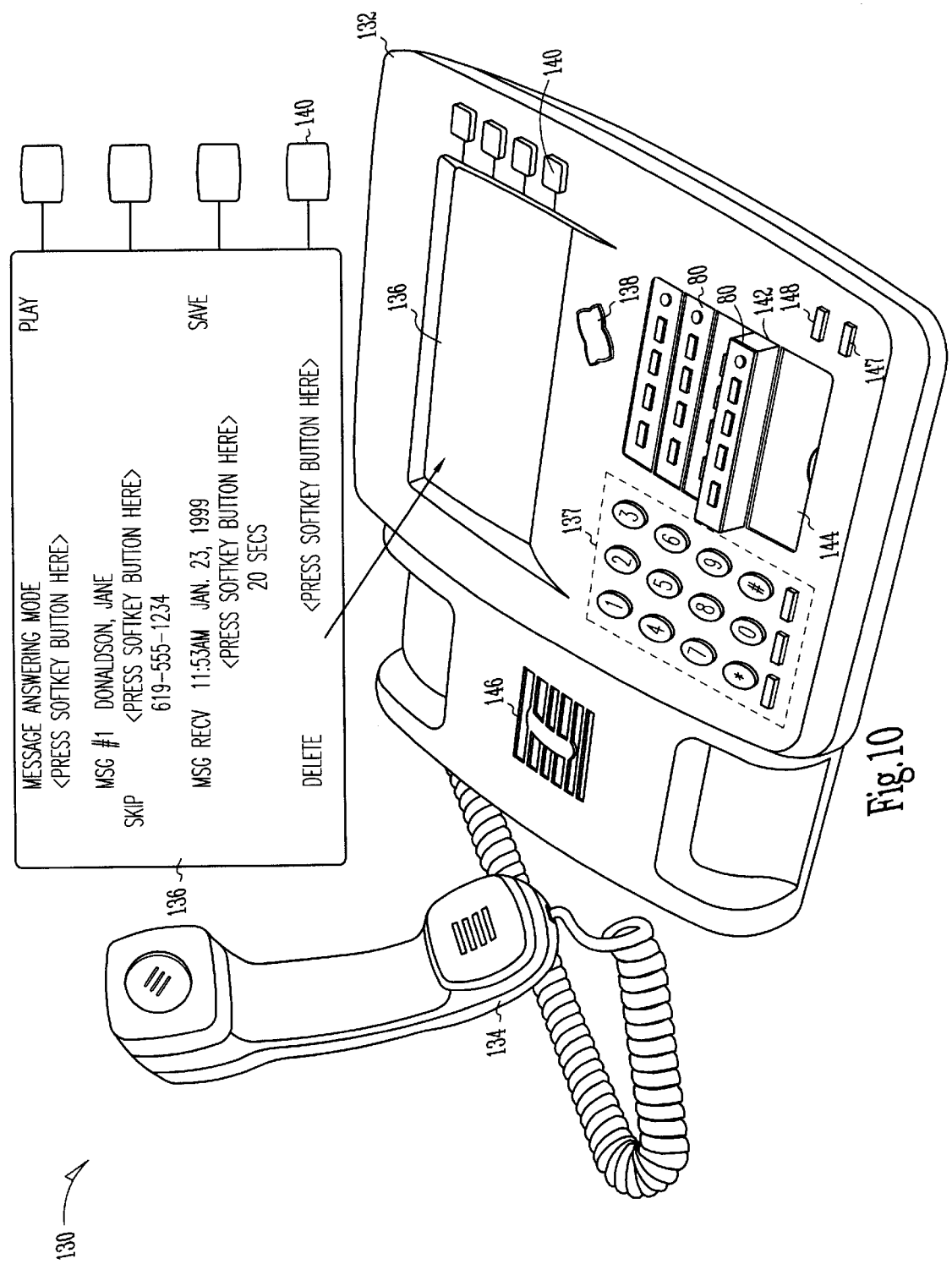
FIG. 10 illustrates another embodiment of modular telephone system 10.

A desk or tabletop version of system 10 is shown in FIG. 10. In the embodiment shown in FIG. 10, telephone system 132 includes a base unit 134 and a handset 136. Handset 134 is connected to base unit 132 through a cord 135 as shown in FIG. 10 and contains the speaker and microphone of a typical desktop unit. In another embodiment, handset 134 is connected to base unit 132 through an RF or optical interface.

Base unit 132 includes a display screen 136, a keypad 137, a switch 138, one or more buttons 140 and one or more module slots 142. Module slots 142 are configured to receive modules 80. Module slots not in use are covered with a plate 144. Buttons 140 may have predefined functions or may be soft keys (such as is shown in FIG. 10) whose function change in response to what is displayed on screen 136. One such soft key embodiment can be understood by reviewing the cut out of screen display 136 and buttons 140 in FIG. 10.

In one embodiment, information displayed on screen 136 is scrolled through using switch 138.

In the embodiment shown in FIG. 10, telephone system 130 includes a speaker 146 which can be used with speaker button 147 to initiate use of system 130 as a speaker phone. In the embodiment shown in FIG. 10, system 130 also includes a mute button 148 for use in muting the telephone.

In one embodiment, in a variation of the speaker phone embodiment shown in FIG. 8, a microphone is packaged with speaker 146 so that it can be added as a module to telephone system 130. In one such embodiment, the module package also includes speaker button 147 and mute button 148. In another embodiment, speaker button 147 and mute button 148 are soft keys accessed through screen 136 and buttons 140. In yet another embodiment, keys in keypad 137 are used to switch between the handset and the speaker phone functions.

Figure 11A:
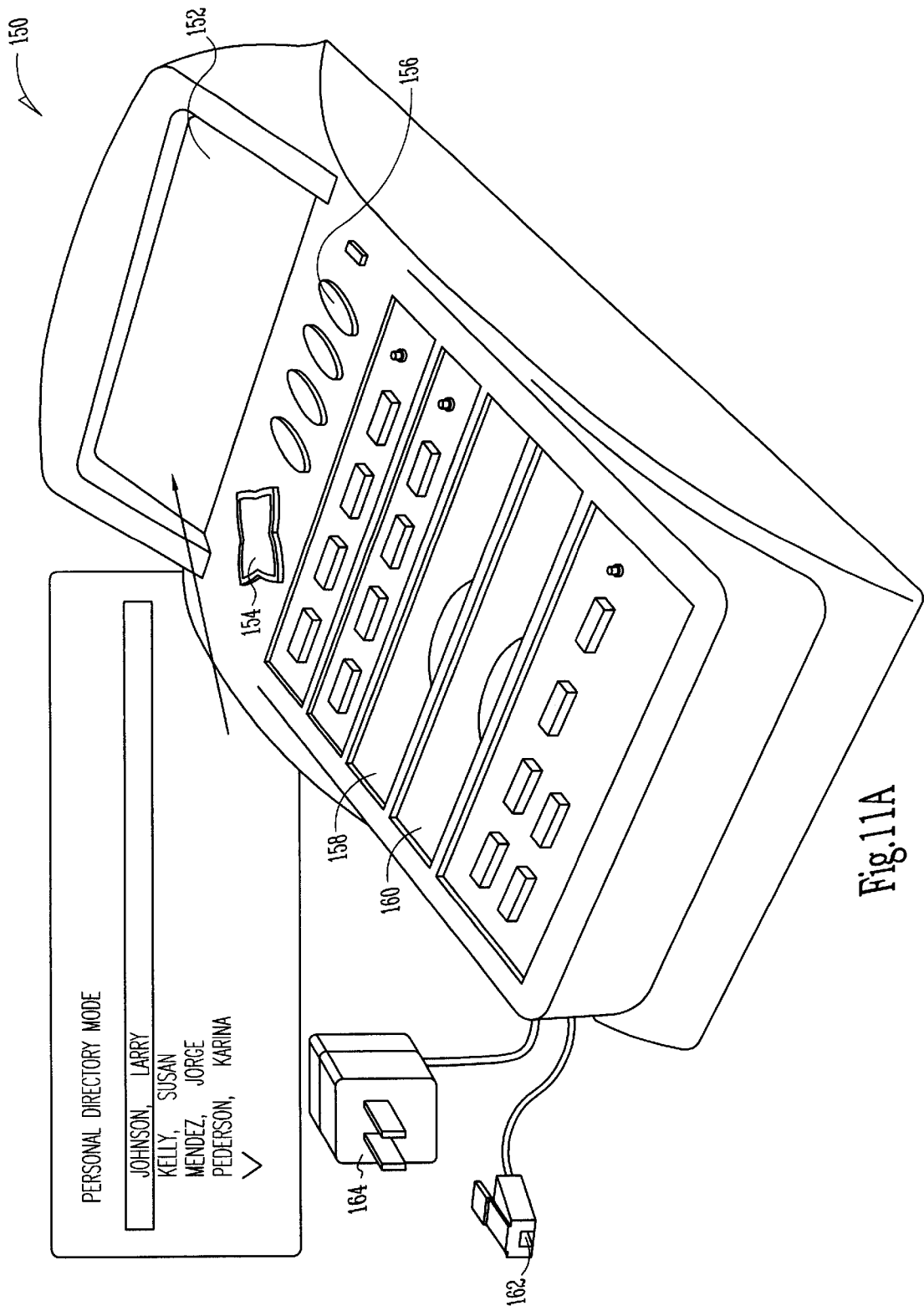
FIG. 11a illustrates a peripheral device embodiment used to add features to a telephone.

Telephone system 10 can also be implemented as a peripheral device 150 connected to a regular telephone unit 151. One such embodiment (without phone unit 151) is shown in FIG. 11*a*. In the embodiment shown in FIG. 11*a*, peripheral device 150 sits between the POTS wiring and the regular telephone unit. Device 150 includes a display screen 152, a switch 154, one or more buttons 156 and one or more module slots 158. An RJ-11 jack 161 connects to the POTS system and an RJ-11 jack from the telephone plugs into device 150. Power is supplied to device 150 through a plug 162 connected to household electrical wiring.

Module slots 158 are configured to receive modules 80. Module slots not in use are covered with a plate 160. Buttons 156 may have predefined functions (in the manner shown in FIG. 9) or may be soft keys (in the manner shown in FIG. 10) whose function change in response to what is displayed on screen 152. One such soft key embodiment can be understood by reviewing the cut out of screen display 136 and buttons 140 in FIG. 10.

In one embodiment, information displayed on screen 152 is scrolled through using switch 154.

Slots 158 may have different configurations. In one embodiment, such as is shown in FIG. 11*a*, one slot 158 is a double-height slot capable of receiving, for instance, a speaker phone interface. One could use a form factor similar to Type III PCMCIA to permit the user to insert two single-height modules 80 or one double-height module 80 in a double-wide slot 158.

Figure 11B:
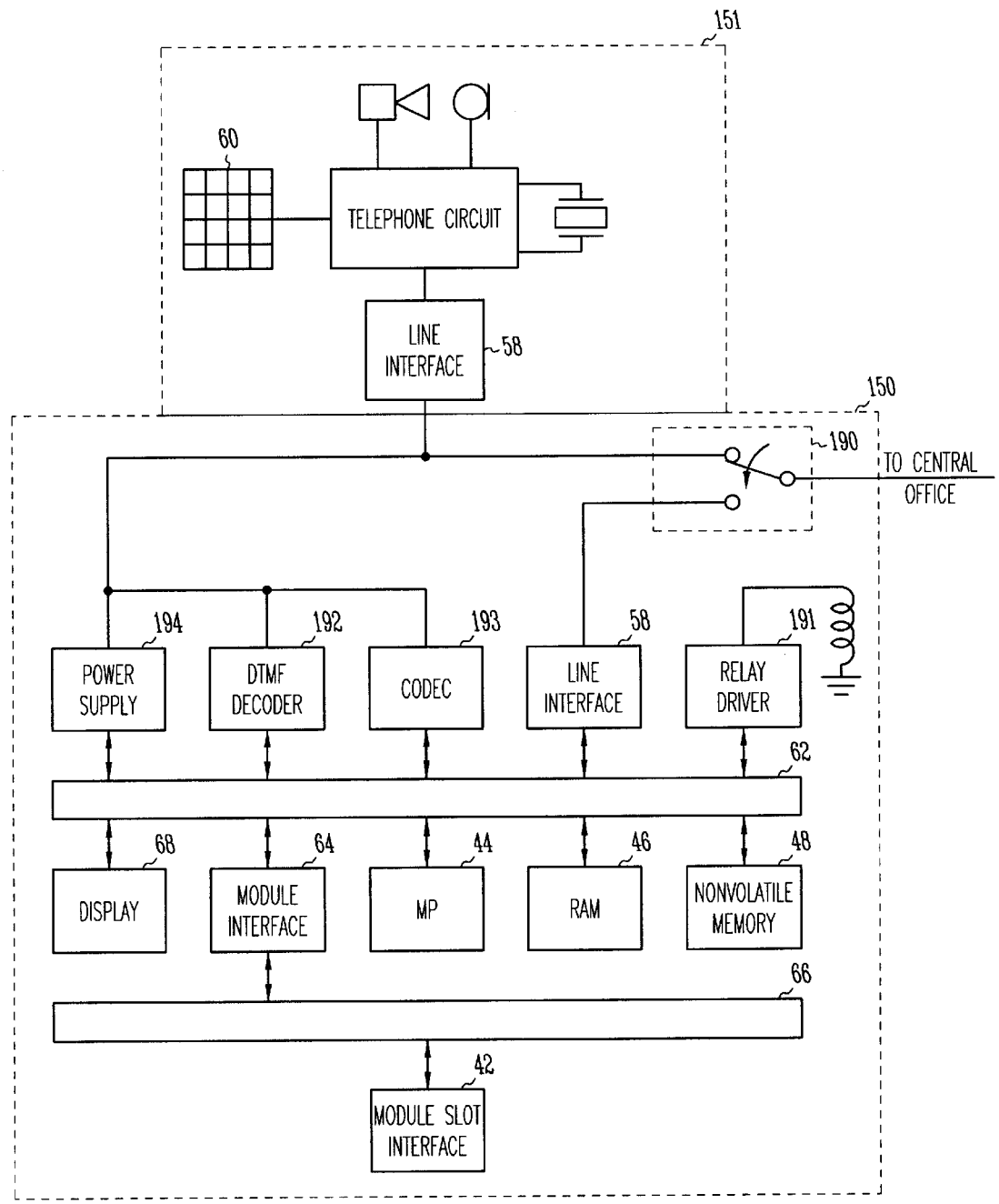

An embodiment of a peripheral device circuit which can be used in peripheral device 150 of FIG. 11*a* is shown in FIG. 11*b*. In the circuit of FIG. 11*b*, telephone unit 151 is connected to peripheral device 150 over a standard telephone line.

Telephone unit 151 is a standard POTS telephone. In the embodiment shown, peripheral device 150 includes a processing unit 44, memory 46, nonvolatile memory 48 and one or more module slot interfaces 42. In one such embodiment a display unit 68 is also included to provide feedback to the user. Display unit 68 may be formed as an LED, LCD, video or other such display device. In one embodiment, display unit 68 is an LCD display capable of displaying the current data and time as well as several lines of information. In one such embodiment, CPU 44 drives the LCD directly. In another embodiment, the LCD display includes its own controller and that controller operates under the control of CPU 44.

In one embodiment, DMTF tones generated by data entry unit 60 in telephone unit 151 are transmitted through line interface 58 to peripheral device 150. In one such embodiment, data entry unit 60 is a keypad. It should be apparent that a data entry system such as a mouse, pointer or stylus or any other known techniques for data entry in graphical or text environment could be used. In one such embodiment, data entry unit 60 and display unit 68 are combined into a touch screen installed within peripheral device 150. In another embodiment, soft keys are shown on display unit 68. In such an embodiment, peripheral device 150 would also include one or more buttons (e.g., buttons 156) corresponding to the soft keys displayed on display unit 68.

In one embodiment, a module adding new features to system 10 is connected through a module slot 158 or 160 to a module slot interface 42. In one such embodiment, processing unit 44 operates in cooperation with module slot interface 42 to read information from a module installed in one of the module slots into memory 46. In the example shown in FIG. 11*b*, processing unit 44 is connected to module slot interface 42 over mother board bus 62, module interface 64 and module backplane interface 66. In one set of embodiments, module backplane interface 66 is a standard interface such as PC/104, USB or PCMCIA. Other methods of connecting the components of circuit 40 will be readily envisioned by one skilled in the art of telecommunications or data processing.

In one embodiment, peripheral device 150 is connected to the central office through a relay 190. FIG. 11*b* illustrates one such embodiment. In the embodiment shown in FIG. 11*b*, peripheral device 150 can capture the signals being generated by standard telephone unit 151 so that they do no get transmitted to the central office. In one such embodiment relay 190 operates under control of relay driver 191 to break the connection between the central office and telephone unit 151 in certain circumstances. For instance, in one embodiment, peripheral device 150 includes a memo mode used to enter data and display the data on display 68. In one such embodiment tones generated by touching keypad 60 are not permitted to reach the central office. Instead they are routed to DTMF decoder 192 for capture and subsequent display. This ensures that the central office does not become confused by what appears to be a random set of DTMF tones.

In one relay embodiment, relay 190 is de-energized at initialization When de-energized, relay 190 connects telephone unit 151 through the POTS network to the central office. When, at 700 a user picks up the handset, unit 151 goes off-hook, and telephone unit 151 sounds a dial tone from the central office. The user can then place a call through the central office. If, however, the user wishes to go into a mode supported by peripheral device 150 (e.g., memo mode) he or she presses a button on peripheral device 150. Relay 190 switches over and isolates unit 151 and device 150 from the central office. (This disconnects units 150 and 151 from the central office. The central office detects on-hook and discontinues the dial tone.). Such an embodiment is shown in FIG. 11*c*.

Figure 11C:
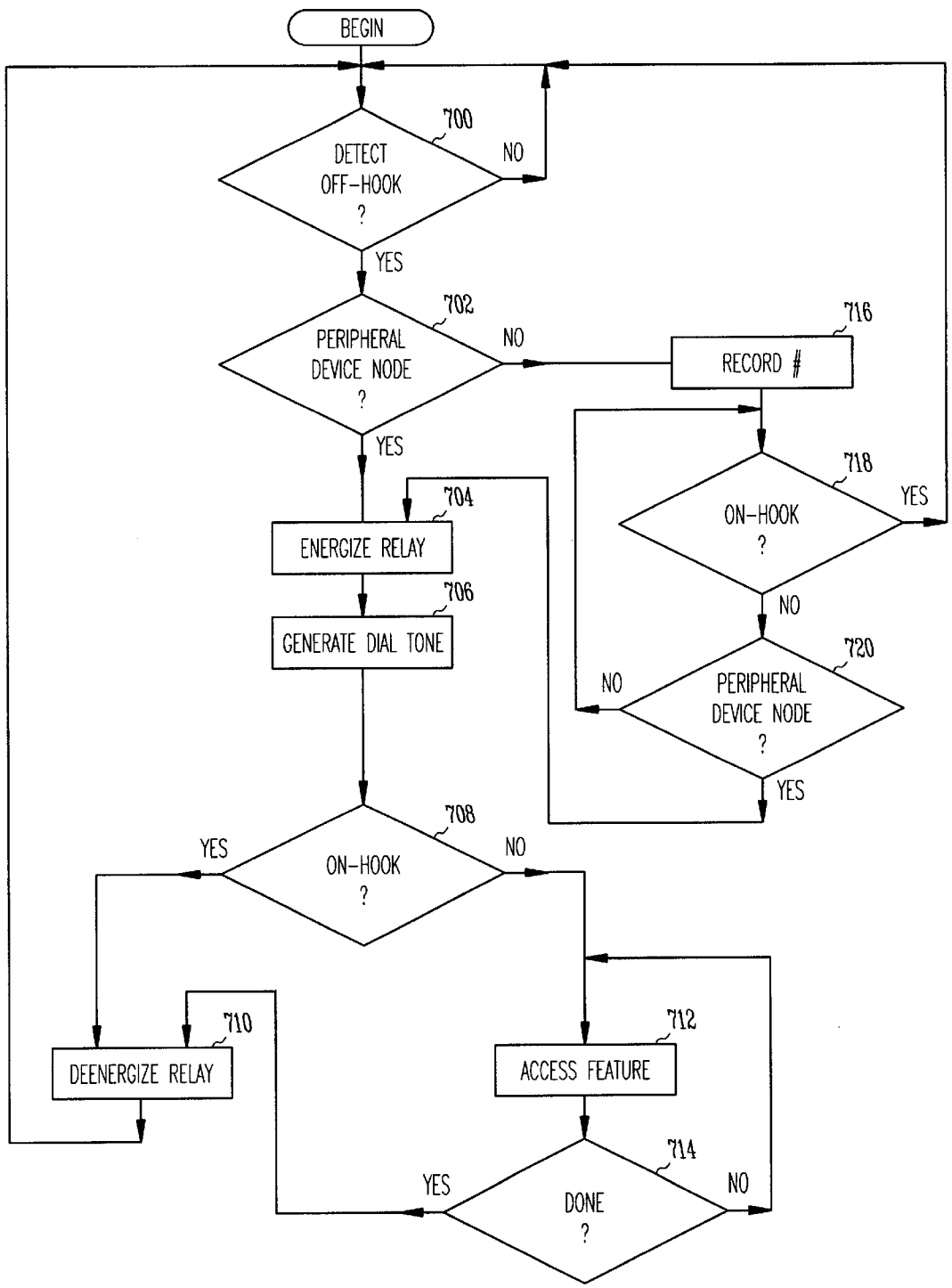
FIG. 11c illustrates a protocol which can be used in the embodiment of the peripheral device shown in FIG. 11b.

In FIG. 11*c*, at 700 peripheral device 150 detects off-hook. Processing unit 150 determines at 702 whether a peripheral device feature is being accessed. If so, control moves to 704 and relay 190 is energized in order to disconnect units 150 and 151 from the central office. Control moves to 706 where a power supply 194 under control of CPU 44 begins supplying dial tone to unit 151. Power to power supply 194 is either supplied through an AC adapter or may be drawn from the POTS line if the current drawn is low enough so as to not appear off-hook to the central office. Processing unit 44 checks at 708 to see whether the phone has been placed back on-hook. If so, relay 190 is deenergized at 710 and control moves back to the top. If not, control moves to 712 and a check is made to see if one of the services is available. If a service is available, the user can access features of the service at 712. A check is made at 714 to see whether the service is complete. If so, control moves to 710.

If, at 702, unit 44 determines that no peripheral device modes are being accessed, control moves to 716 and DTMF tones generated by the user are captured and store in memory 46. A check is made at 718 to determine if telephone unit 150 has been placed back on-hook. If so, control moves to 700.

If, at 718, unit 151 remains off-hook, control moves to 720 and a check is made to see if a peripheral device mode is being invoked. If so, control moves to 704 and the relay is energized. If not, control moves to 718.

In one embodiment, a user accesses features on peripheral device 150 by depressing buttons on keypad 60. The tones are captured and converted to symbols by DMTF decoder 192 and passed to processing unit 44. From there they are either stored in memory 46 or simply displayed in display 68. If a user needs to place a call during data entry, relay 190 is turned off and dial tone from power supply 194 is turned off.

In one embodiment, peripheral device 150 continues to monitor DTMF tones while the user is placing the call. In one such embodiment, depressing one of the * or # keys while keeping telephone unit 151 off-hook invokes a service within peripheral device 150. Peripheral device 150 treats subsequent keystrokes as either commands or data, depending on the application.

CODEC 193 is used to digitize a user's voice for recording messages, etc. It is described in more detail below.

Modules

Figure 12:
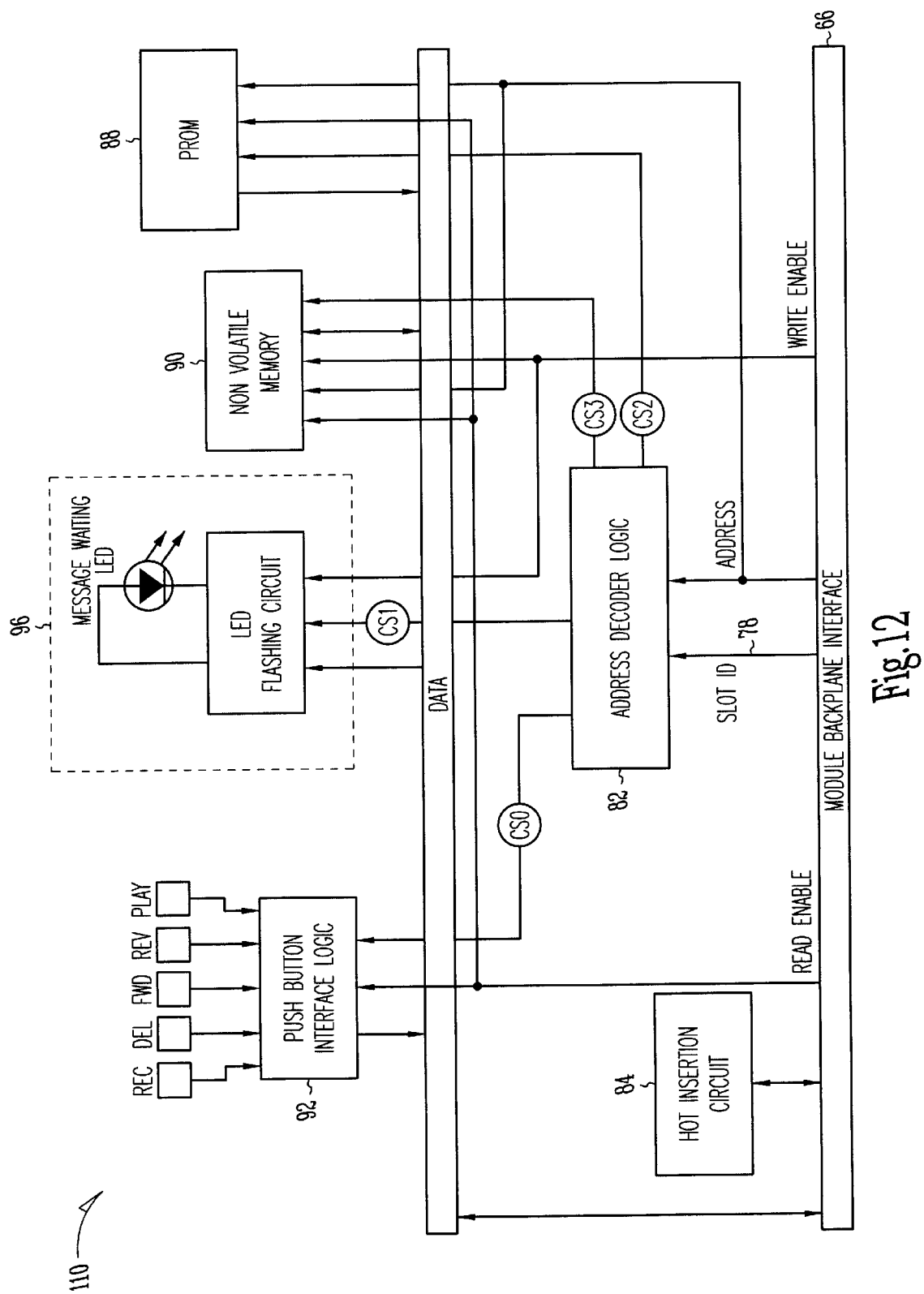
FIG. 12 illustrates an answering machine/message manager module which can be used in modular telephone system 10.

FIG. 12 illustrates one embodiment of an answering machine/message manager module 110 which can be used in modular telephone system 10. In the module shown in FIG. 12, push button interface 92 is connected to five pushbuttons 94 (labeled REC, DEL, FWD, REV and PLAY). In one embodiment, greeting and incoming messages are digitized by CPU 44 and stored on the main board. In a second embodiment, greeting and incoming messages are digitized by the CPU and stored in NVRAM 90 on module 110. (This approach requires much more storage than the main board storage approach and, as such, it may be easier to justify putting NVRAM on this module. One advantage of local NVRAM is that messages can go with module 110 when it is moved from one system 10 to another). In yet another embodiment, greeting and incoming messages are digitized using an analog to digital converter or CODEC under control of CPU 44. In another embodiment, this function, and that of CPU 44 is performed in a single digital signal processor or microprocessor device.

In the embodiment shown in FIG. 12, feedback mechanism 96 is a flashing LED used to indicate that there is a message waiting. Messages are played back through handset 22 or through speaker phone interface 26, if available.

In the embodiment shown in FIG. 12, five buttons (labeled REC, DELETE, FWD, REV and PLAY) are used in the user interface. REC is used to record an outgoing message. DELETE is used to delete incoming or outgoing messages from memory. FWD is used to skip the current stored message and point to the next stored message. REV is used to go back to a previous stored message. PLAY retrieves and plays the message. In operation, feedback mechanism 96 (e.g., an LED) is activated when a message is received and is deactivated when the message is played. In one such embodiment, a digital integrated circuit is used to record incoming and outgoing messages.

Figure 13A:
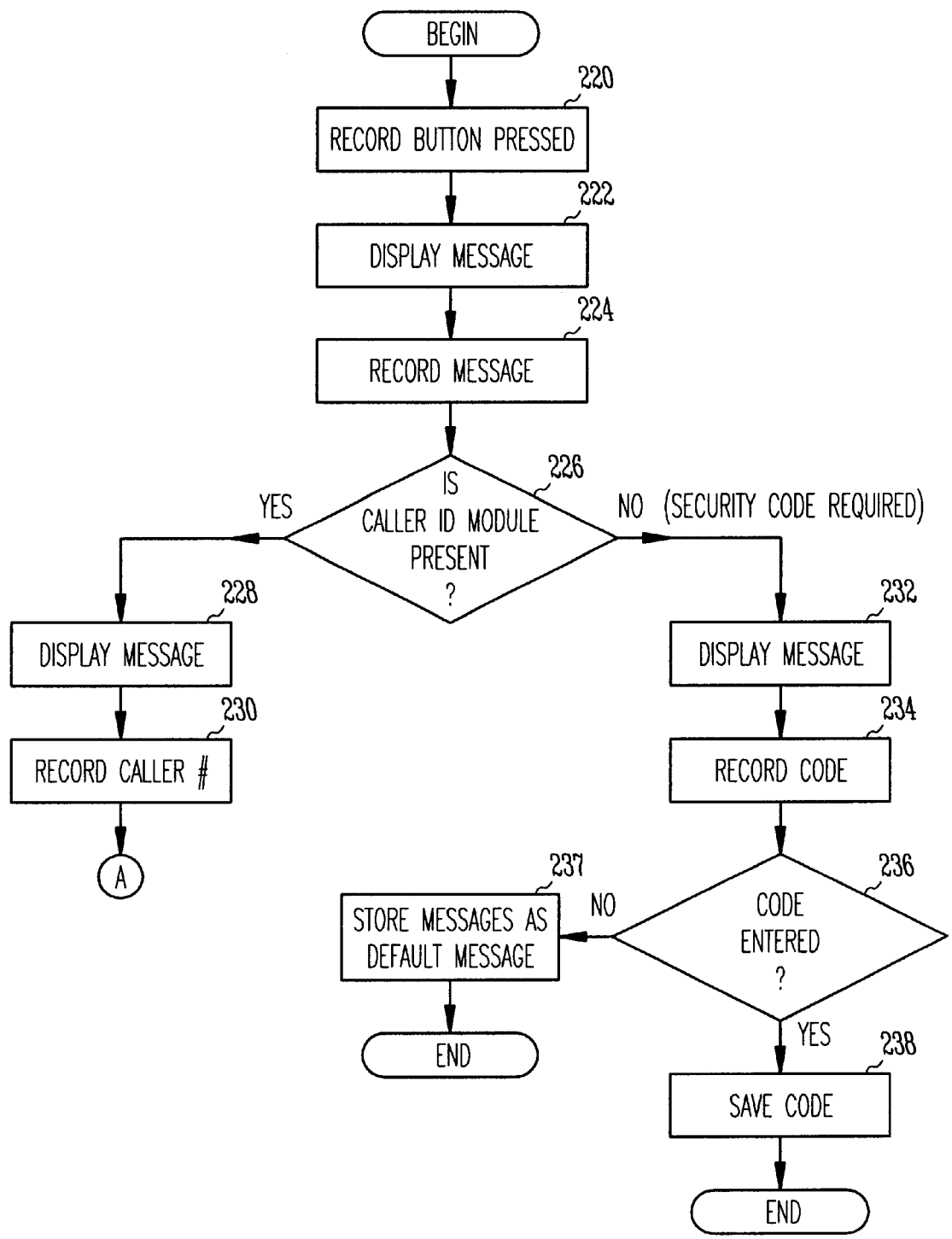
FIGS. 13a and 13b illustrate a custom message entry protocol which can be used in the module of FIG. 12.
Figure 13B:
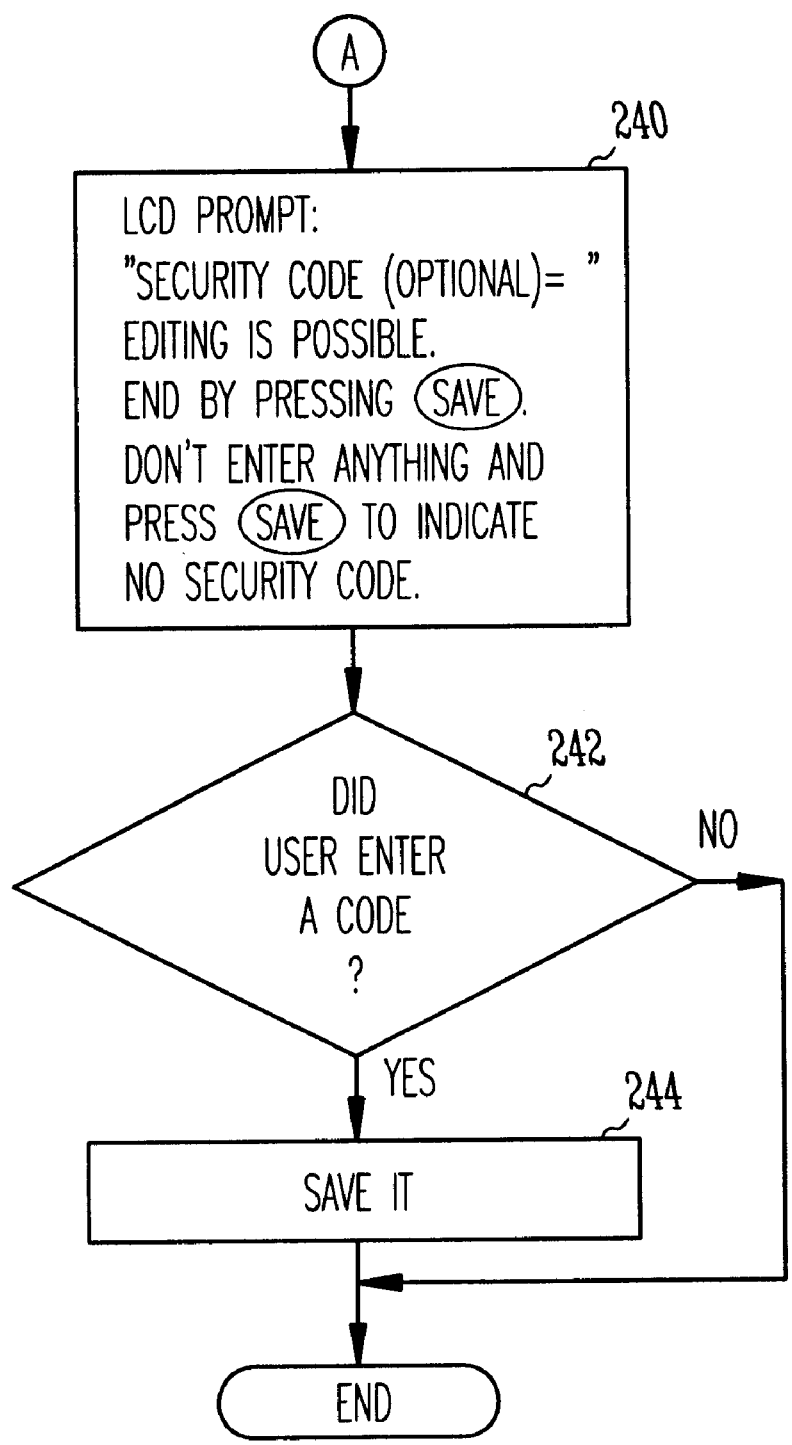

A custom message entry protocol which can be used with a telephone system 10 having an answering machine/message manager module 110 is described in FIGS. 13*a* and 13*b*. In one embodiment, the custom message is played to incoming callers as a result of detecting the caller ID of the incoming call. In another embodiment, the custom message can also be accessed, if a caller ID module is not installed or the caller ID is not recognized, by the caller entering a security code after a connection is established. Other methods of identifying a caller may be used. In one embodiment, the caller identifier is a sequence of DTMF tones entered after the call has been connected. In another embodiment, the caller identifier uses voice recognition or other biometric identification to identify a caller once the call has been connected. The protocol will be described in the context of caller ID.

In FIGS. 13*a* and 13*b*, a user, at 220, presses the button 94 labeled REC. A prompt is displayed to the user at 222. In one embodiment, two buttons, SAVE and CANCEL, are shown as soft keys on display 20. In such an embodiment, the prompt is displayed on display 20 and takes the form of a message such as "Recording new message. Press SAVE when finished." In another such embodiment, the prompt is displayed more cryptically through one or more visual indicators 104 on module 110, or through a display element 106 on module 110. The user can back out at any time by pressing the CANCEL button.

At 224, the user speaks into handset 22 or microphone 28 to record the new message and touches SAVE to save the message. The message can be "rewound", stopped, played, deleted or recorded again until the user is satisfied.

At 226, a determination is made, e.g., by CPU 44, whether a caller ID module is present. If, at 226, a determination is made that a caller ED module is not present, in one embodiment, the message is saved and message entry is complete. This message then becomes the default message.

In the embodiment shown in FIGS. 13*a* and 13*b*, however, provision is made for entry by the user of a security code to be associated with the recorder message. In one such embodiment, if, at 226, a determination is made that a caller ID module is not present, control moves to 232 and display 20 displays "Enter security code." The user enters a security code at 234 and saves it using the SAVE button. A test is made at 236 to determine if a security code was entered. If not, control moves to 237 and the message is saved as the default message. If, however, a code was entered, control moves to 238 and the security code and message are saved. The message is then played to the caller whenever that security code is entered.

If, at 226, a determination is made that a caller ID module is present, control moves to 228 and display 20 displays "Enter caller phone number." Control then moves to 230, and CPU 44 waits until a number is entered and saved by touching the SAVE button. The number can be edited as necessary. Control then moves to 240.

In one embodiment, at 240, a security code is required and steps similar to 232–238 are executed. In another embodiment, as is shown in FIGS. 13*a* and 13*b*, entering a security code is optional at this stage. In one such embodiment, a message like "Security code (optional)" is displayed on display 20 and provision made for the user to enter a security code, if desired. A check is made at 242 to see if the user entered a security code. If so, the security code is saved at 244 and the protocol is finished. A security code may be attached to a particular caller ID to ensure, for instance, that a voice memo is retrieved by only the person for whom the message is intended.

Figure 14:
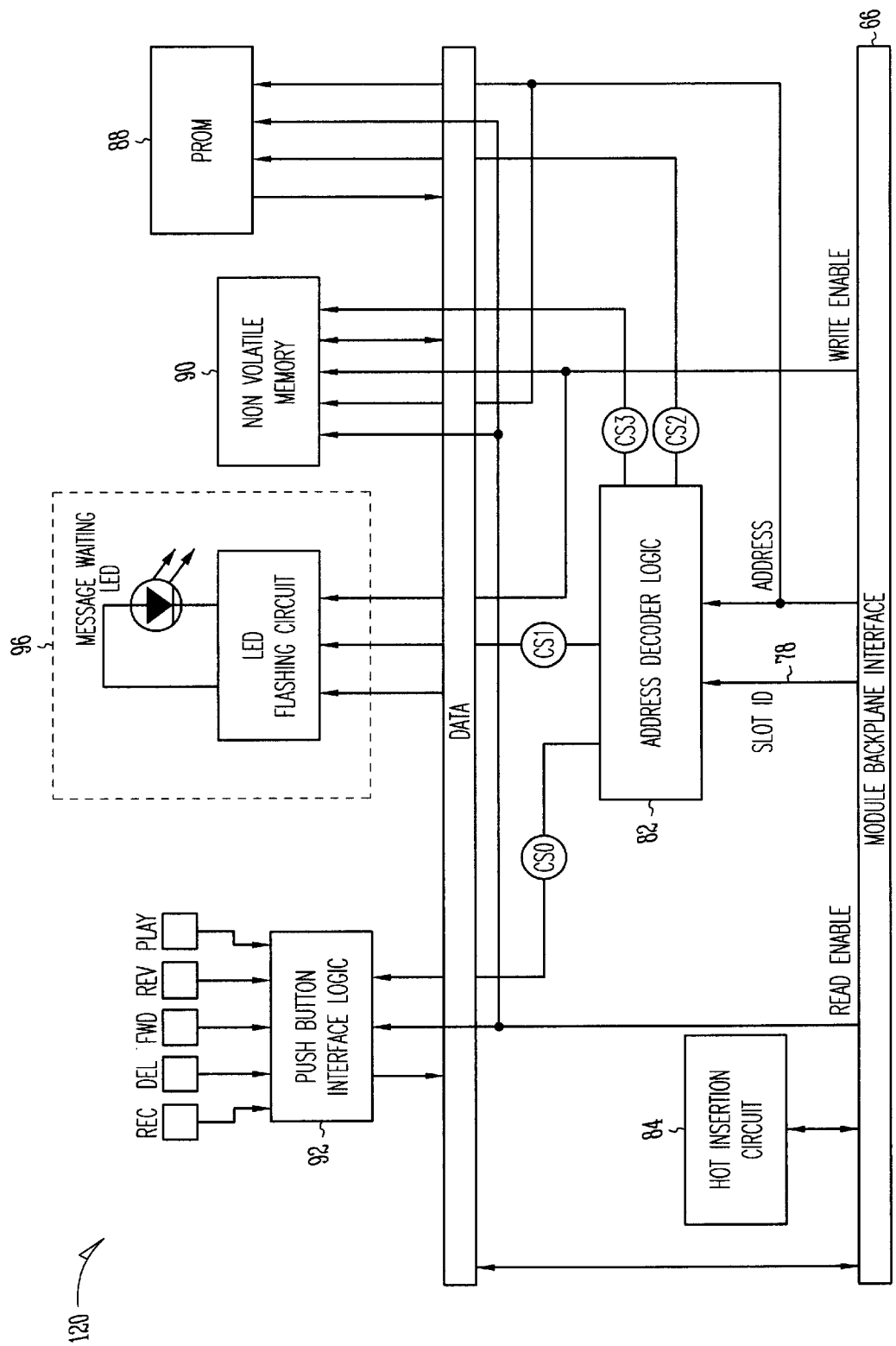
FIG. 14 illustrates a voice message service module which can be used in modular telephone system 10.

A voice message service module 120 which can be used with a voice messaging service obtained through the central office is displayed in FIG. 14. In the module shown in FIG. 14, push button interface 92 is again connected to five pushbuttons 94 (labeled REC, DEL, FWD, REV and PLAY). Now, however, the buttons work in conjunction with the central office to provide access to messages stored at the central office.

In the embodiment shown in FIG. 14, feedback mechanism 96 is a flashing LED used to indicate that there is a message waiting. The twisted pair line connecting system 10 to the central office is polled to detect a known special dial tone indicating that a message is waiting to be retrieved. (Usually, the user must be a subscriber of the central office's voice messaging service for this signal to be transmitted to system 10.) Messages are played back through handset 22 or through speaker phone interface 26, if available.

In the embodiment shown in FIG. 14, five buttons (labeled REC, DELETE, FWD, REV and PLAY) are used in the user interface. Their function is similar to the function of the buttons in FIG. 12 above.

Figure 15:
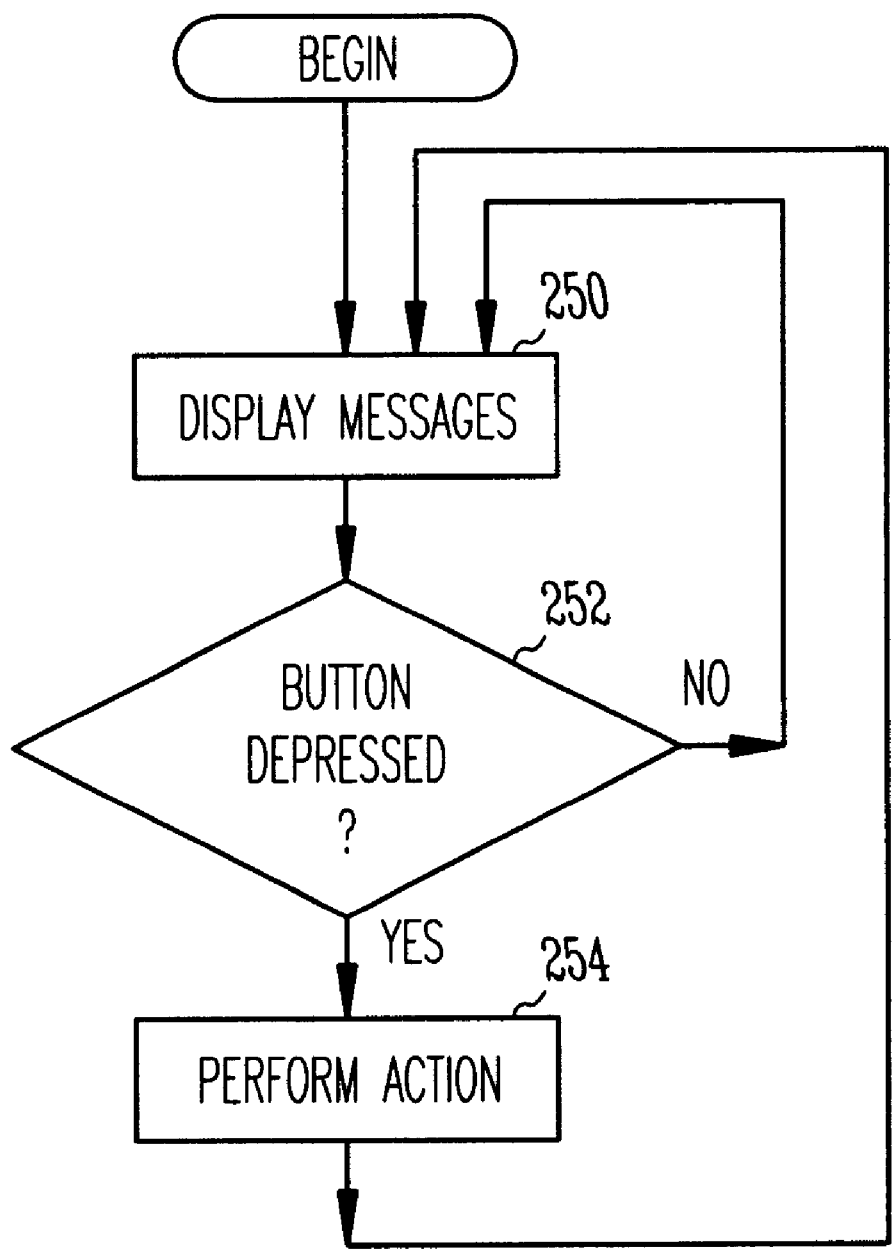
FIG. 15 illustrates a protocol used to review or delete a message in the modules of FIGS. 12 and 14.
Figure 16A:
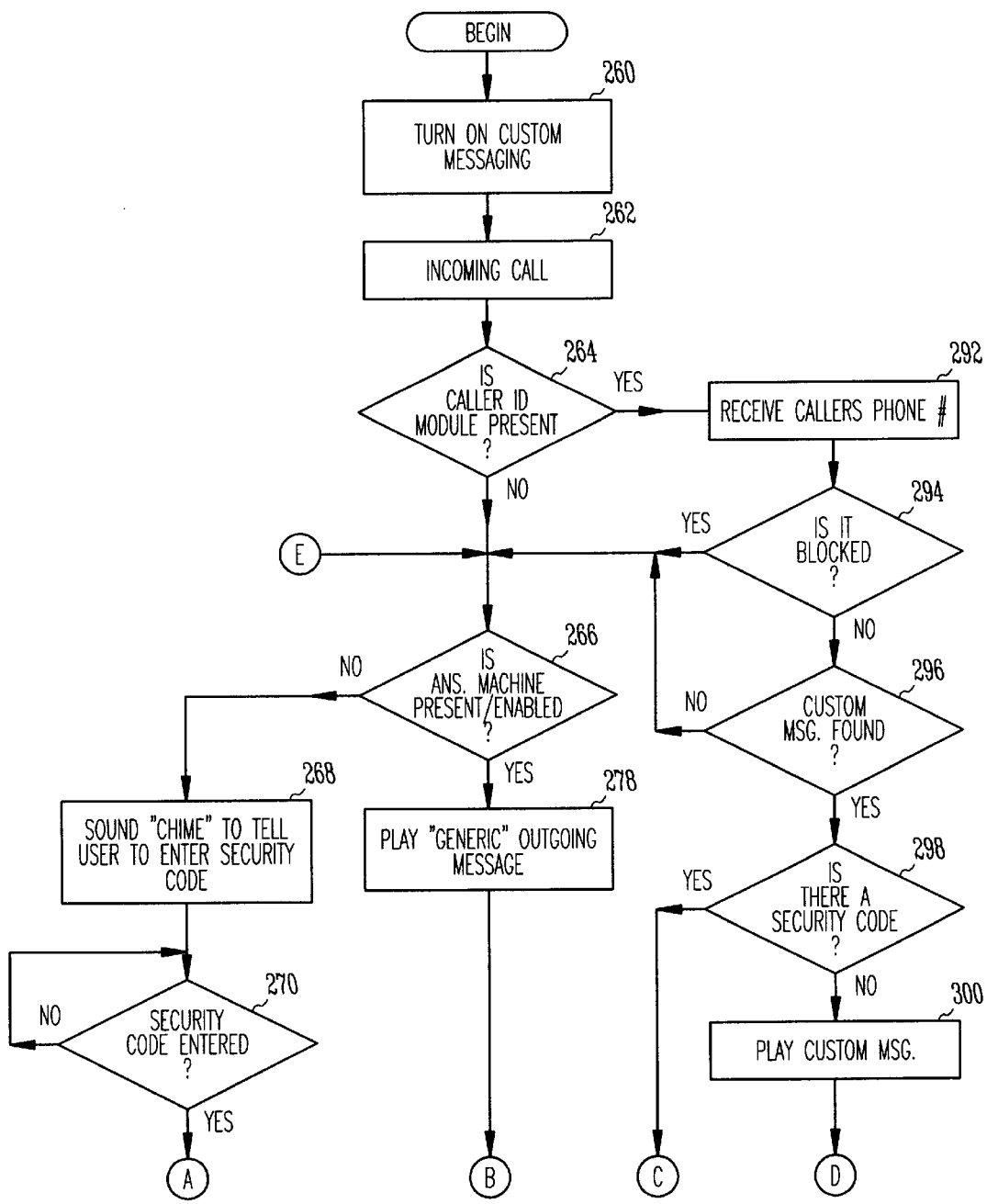
FIGS. 16a–d illustrate a protocol used to play custom messages in the modules of FIGS. 12 and 14.
Figure 16B:
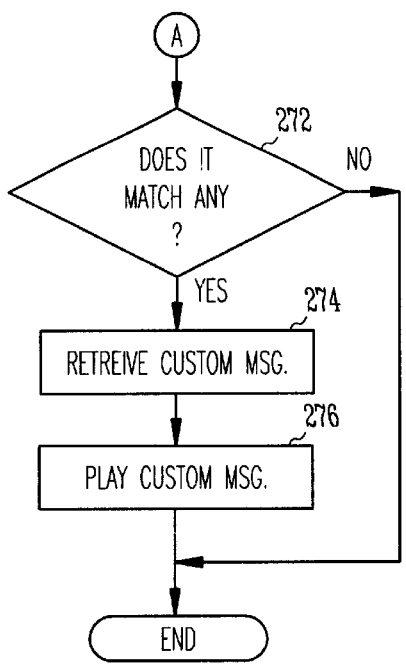
Figure 16C:
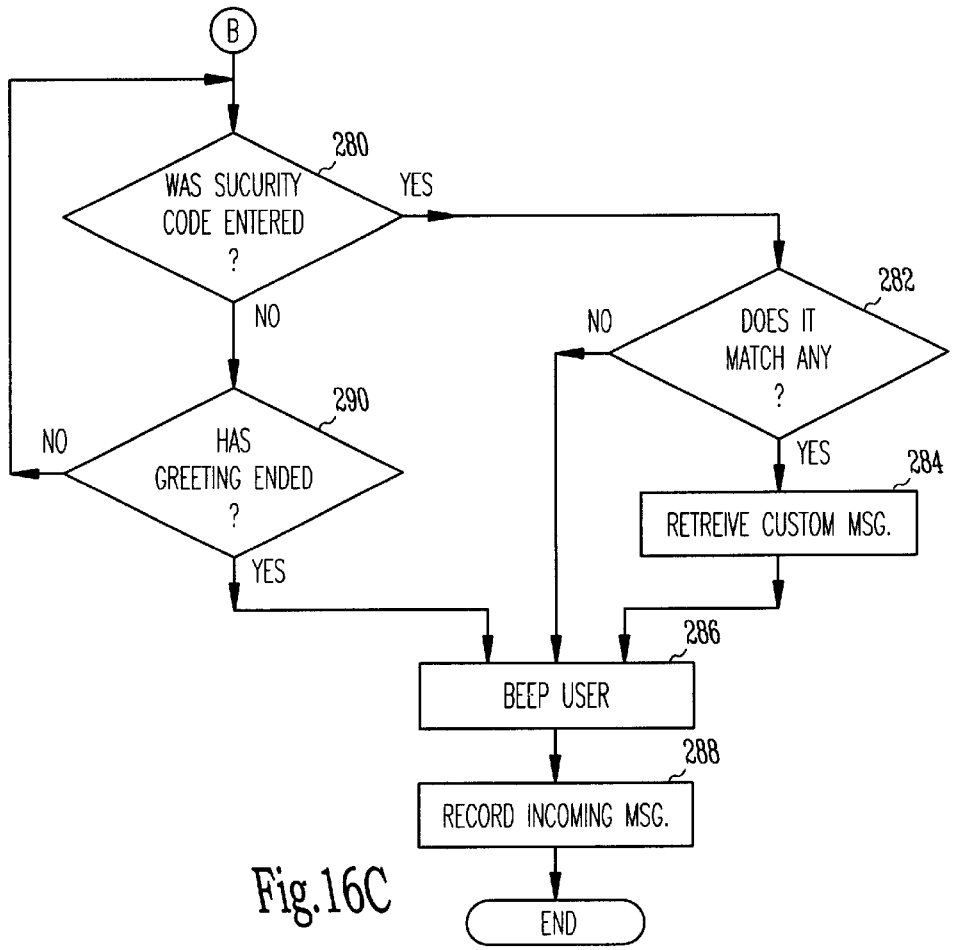
Figure 16D:
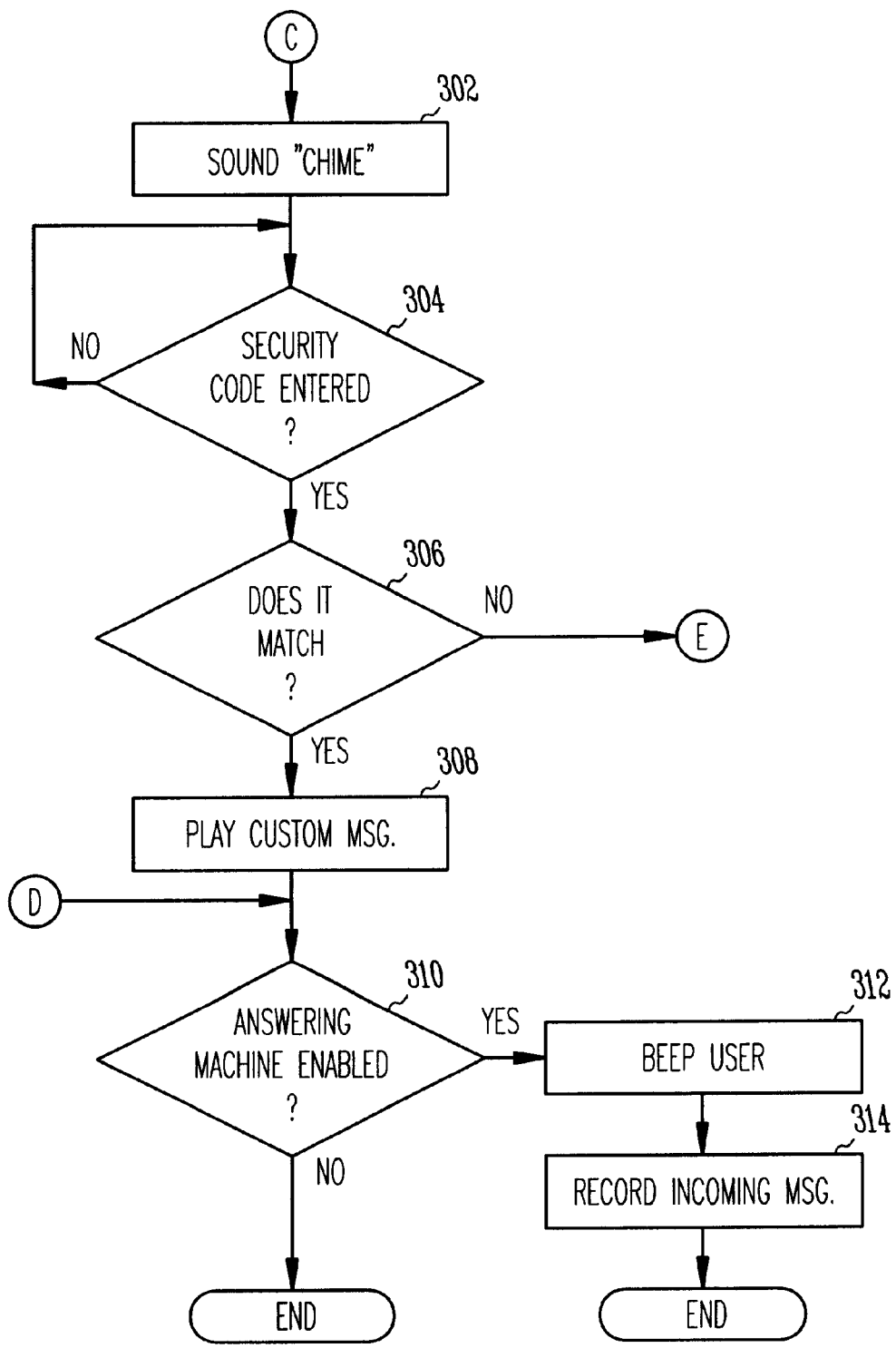
Figure 17:
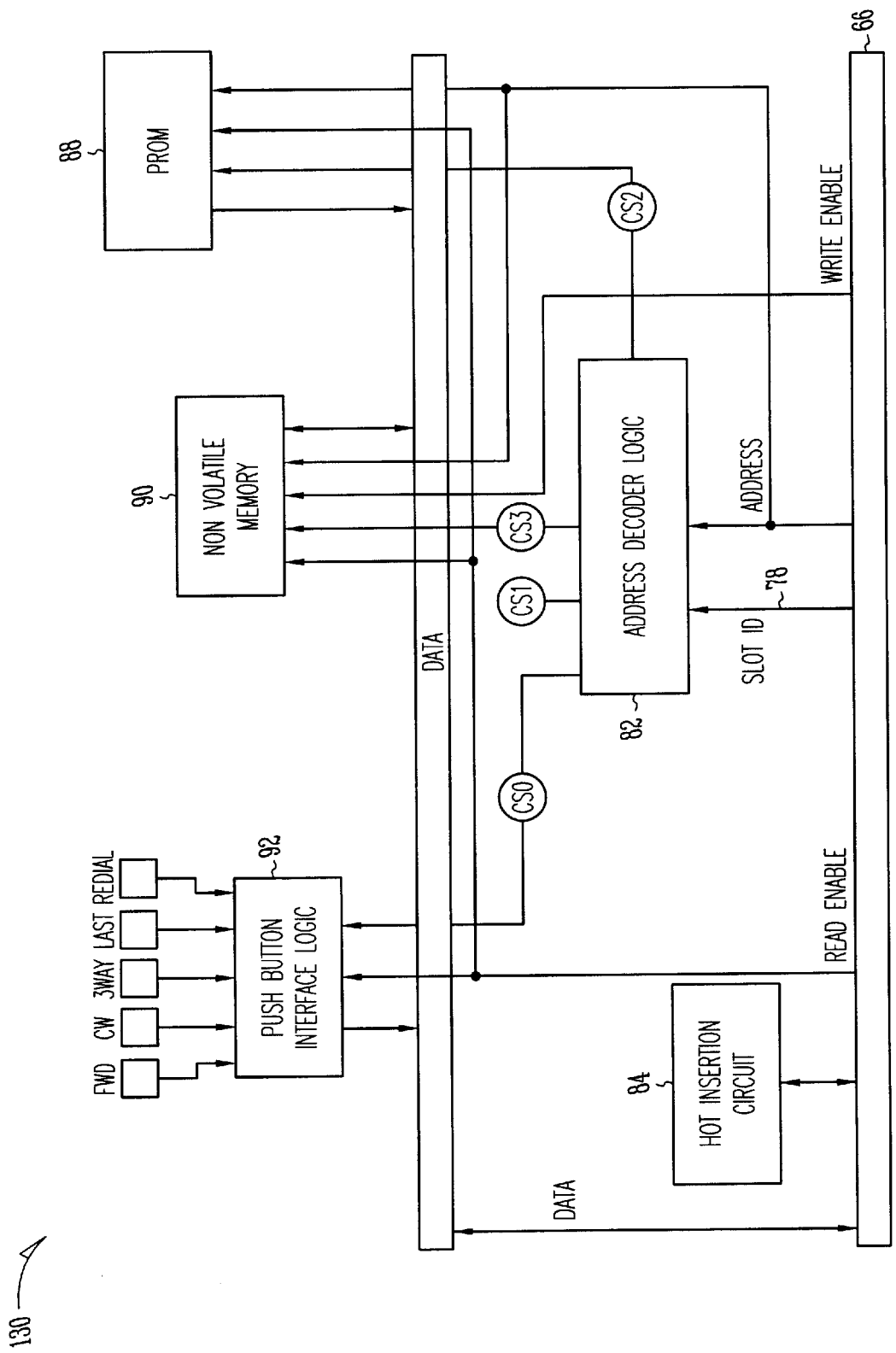
FIG. 17 illustrates a central office feature manager service module which can be used in modular telephone system 10.

In one embodiment, custom messages in module 110 can be reviewed or deleted at any time. One protocol which can be used to review or delete a message is shown in FIG. 15. In FIG. 15, at 250, a list of messages stored in base unit 40 or in module 110 is listed on display 68 with one of the messages highlighted. At 252, a check is made to determine if one of the buttons on module 110 has been depressed. If not control moves to 250 and the loop is repeated.

If a determination is made at 252 that a button has been depressed, at 254 the appropriate action is performed. In one embodiment, for instance, the user scrolls through the list of messages using the FWD and REV buttons shown in FIG. 12. Likewise, the highlighted message can be deleted or played by depressing the DEL and PLAY buttons, respectively.

Custom messages can be used to handle a variety of callers. For instance, a custom message can be played to all callers having caller IDs that are blocked, or to callers who provide no caller ID. At the same time, a custom message could be created for the telephones of special people in your life. For instance, a custom message might be appropriate to greet a relative or significant other, or to use as a voice memo for a particular person. Finally, a special message could be entered to answer when that annoying aluminum siding salesman calls during dinner. FIG. 16 illustrates one protocol which can be used to play custom messages in systems having module 110. In the embodiment shown in FIG. 16, at 260 custom messaging is enabled. When an incoming call is detected at 262, control moves to 264 and a determination is made whether a caller ID module is present. If not, control moves to 266 and a determination is made whether an answering machine module 110 is present and enabled.

If no answering machine is available the only use of the custom message is as a voice memo. In that case control moves to 268 and a "chime" or other sound is used to encourage the caller to enter a security code. A check is made at 270 to determine if a security code has been entered. If so, control moves to 272 and a comparison is made of the security code entered against a list of security codes. If no security code is entered, or the security code is not on the list of security codes, the call is terminated. If, however, the security code is on the list of security codes, the custom message associated with the security code is retrieved at 274 and played at 276.

If, at 266, it is determined that an answering machine is available, control moves to 278 and a generic greeting is played. In the embodiment shown in FIG. 16, a user may enter a security code anytime before the generic greeting ends. A check is made at 280 to determine if a security code was entered. If not, control moves to 290 and a check is made whether the generic greeting is done. If so, control moves to 286. If not, control moves to 280.

If, however, a determination is made at 280 that a security code has been entered, control moves to 282 and a comparison is made between the security code entered and a list of security codes. If the security code is not on the list of security codes, control moves to 286, the caller is beeped and control moves to 288 to record the incoming message. In one embodiment, the length of the incoming message is constrained to be the shorter of when the caller hangs up or a predefined period of time (e.g., 45 seconds). The incoming message is digitized and stored either in module 110 or within nonvolatile memory 48.

If at 264 a determination is made that a caller ID module is, in fact, present, control moves to 292 and the caller ID is captured. A determination is made at 294 to see if the caller ID is blocked. If so, control moves to 266. If not, however, control moves to 296 and a determination is made whether the caller ID is associated with a custom message. If not, control moves to 266.

If, however, a determination is made at 296 that the caller ID is associated with a custom message, a check is made at 298 to see if a security code is required before playing the custom message. If not, control moves to 300 and the custom message associated with the caller ID is played. Control then moves to 310.

If, at 298, a determination is made that a security code is required before playing the custom message, control moves to 302. A "chime" or other such sound is played at 302 and a determination is made at 304 whether a security code has been entered. If so, control moves to 306 and a comparison is made between the security code entered and the security code associated with the caller ID received. If the two do not match, control moves 266.

If, however, the two do match, control moves to 308 and a custom message associated with the caller ID is played. (In one embodiment, each caller ID can have a list of security codes associated with it. In such an embodiment, it is the combination of caller ID and security code which is used to determine the custom message to be played to the caller.) Control then moves to 310.

At 310, a determination is made whether answering machine module 110 is present and enabled. If not, the call is terminated. If, however, answering machine module 110 is present and enabled, control moves to 312, the caller is beeped and control moves to 314 to record the incoming message. In one embodiment, the length of the incoming message is constrained to be the shorter of when the caller hangs up or a predefined period of time (e.g., 45 seconds). The incoming message is digitized and stored either in module 110 or within nonvolatile memory 48.

In one embodiment, a central office feature manager module 130 is used to extend the functionality of system 10. Such a module provides simple buttons which correspond to the dialing codes used to control features offered by the telephone company, such as call forwarding. Therefore the user doesn't have to remember the calling codes. One such system is show in FIG. 18. In the embodiment shown in FIG. 18, depressing the FWD button causes system 10 to send a code to the central office instructing the central office to forward calls to a different telephone number. In one embodiment, the telephone number the telephone is forward to is predefined. In another embodiment, depressing the FWD button in module 130 causes CPU 44 to display on display 68 the telephone number to which the telephone forwards by default. The user then uses data entry unit 60 to modify the telephone number or to enter a new telephone number. A message is then displayed on display 68 showing that the telephone is forwarded. In one embodiment, forwarding is canceled, and the central office is notified, by depressing the FWD button again.

In a similar fashion, depressing the CW button invokes call waiting, depressing the 3WAY button invokes three way calling, depressing the REDIAL button causes system 10 to redial the last number dialed and depressing the LAST button causes CPU 44 to display the last caller ID. In one such embodiment, repeatedly depressing LAST causes CPU 44 to scroll back through a list of caller IDs from most recently received to least recently received.

Figure 18:
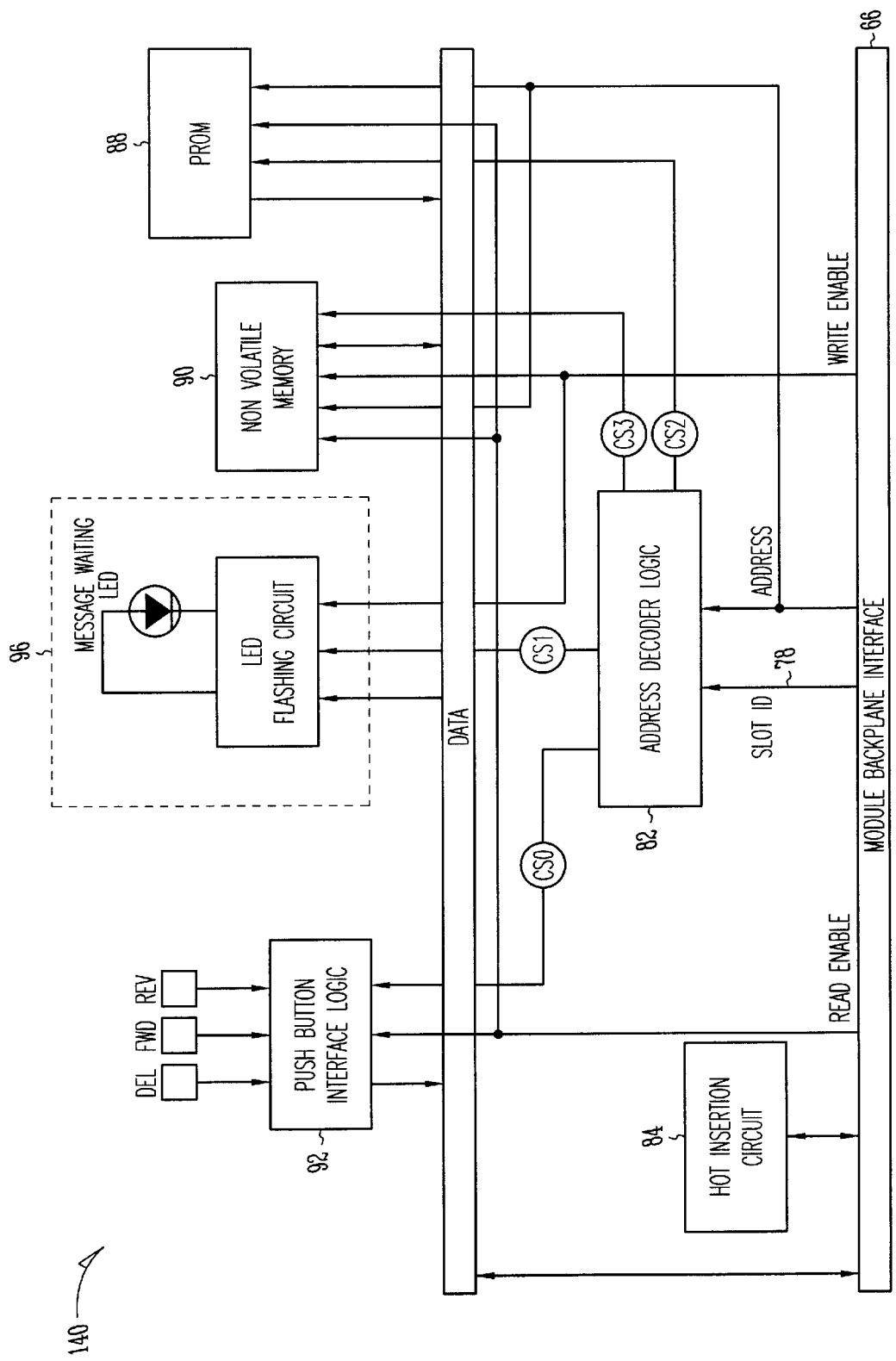
FIG. 18 illustrates a caller ID module which can be used in modular telephone system 10.

A caller ID module 140 which can be used in system 10 is shown in FIG. 18. Such a module adds standard caller-ID functionality to telephone system 10. In the embodiment shown in FIG. 18, module 140 includes a pushbutton interface 92 which includes a DEL button, a FWD button and a REV button. In one embodiment, nonvolatile memory 90 in module 140 is used to store two or more caller ID entries. The LED is activated when an incoming call is detected and the caller-ID information is displayed on display 68. The current caller-ID entry displayed in display 68 can be deleted by depressing DEL of module 140. In addition, the next entry in the list of caller IDs stored in module 140 is displayed when the user depresses the FWD button of module 140. Similarly, the previous entry in the list of caller IDs stored in module 140 is displayed when the user depresses the REV button of module 140.

In one embodiment, caller ID module 140 contains enough on-board memory to store up to for instance, one hundred caller ID entries. Each entry must be large enough to store all the information received from the central office specific to the caller ID. In addition, it can be advantageous to attach additional information to each entry at the discretion of the user.

A personal directory module 150 can also be used advantageously in telephone system 10 of FIG. 1. Personal directory module 150 allows user to maintain a personal phone directory on a system 10. In one embodiment, directory module 150 captures incoming numbers with the push of a button. In addition, the user can enter numbers manually.

In one embodiment, personal directory module 150 includes a "short-dialing" feature. Short dialing is a user convenience; users can key in just the last 4 digits of number, rather than having to remember all of the digits, and personal directory module 150 will translate the four digit code into a telephone number. Such a feature will be especially important when in the near future, all phone calls will require 10 digit dialing. One embodiment of such a feature is shown in FIG. 25.

Figure 25:
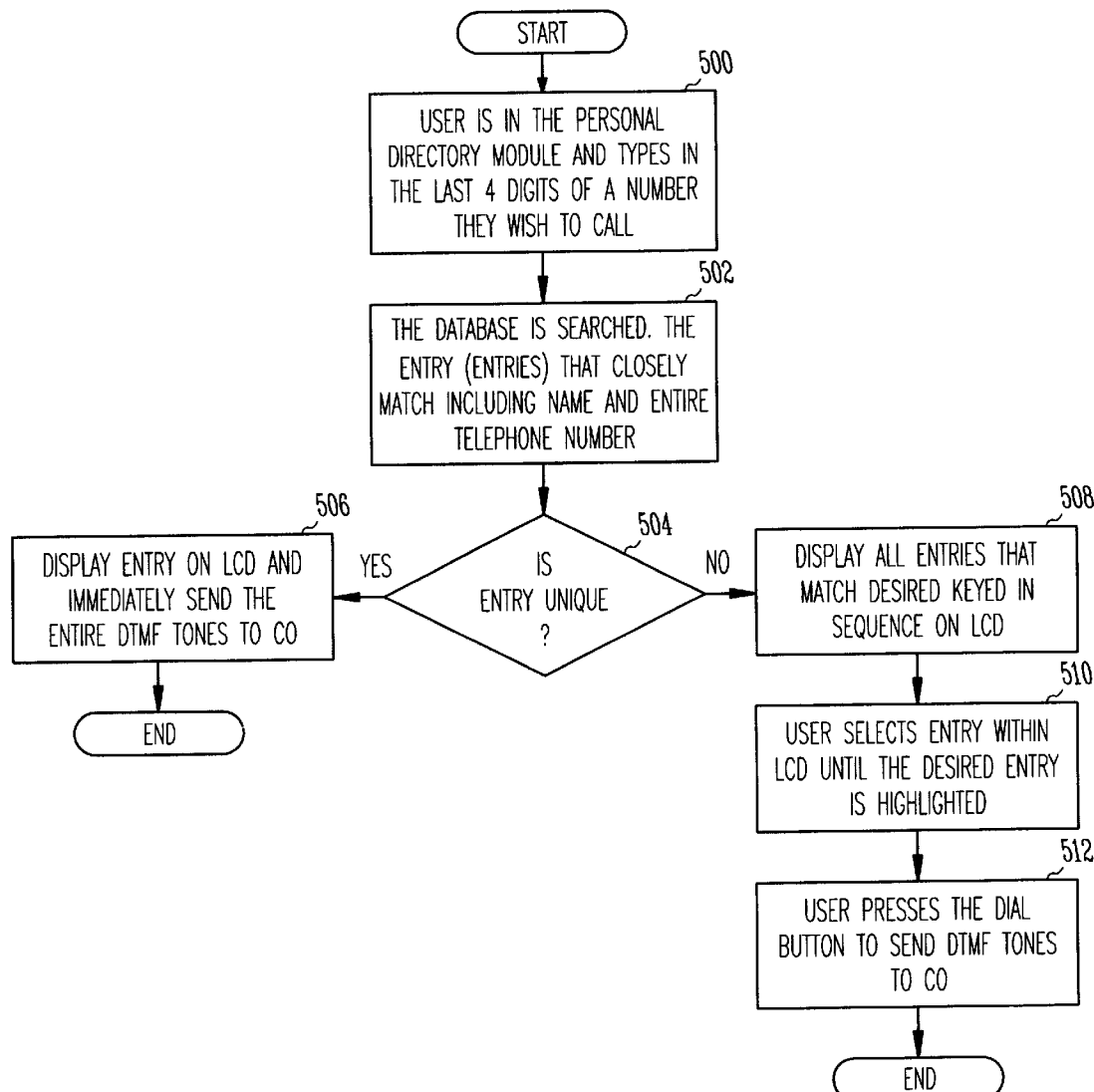
FIG. 25 illustrates short dialing in a module such as is shown in FIG. 19.

In the embodiment shown in FIG. 25, at 500 a user in personal directory module mode types in the last four digits of the telephone number that user is attempting to reach. Control moves to 502 and CPU 44 searches the personal directory database for entries which match the four digits entered. If the entry is determined to be unique at 504, control moves to 506, the entry is displayed and appropriate DTMF tones are sent to the central office.

If the entry at 504 is not unique, control moves to 508, and a list of matching entries is displayed in sequence on display 68. Control then moves to 510, where the user selects an entry by, for instance, first highlighting that entry and then depressing the ENTER button. The selected entry is displayed at 512 and appropriate DTMF tones are sent to the central office.

Figure 19:
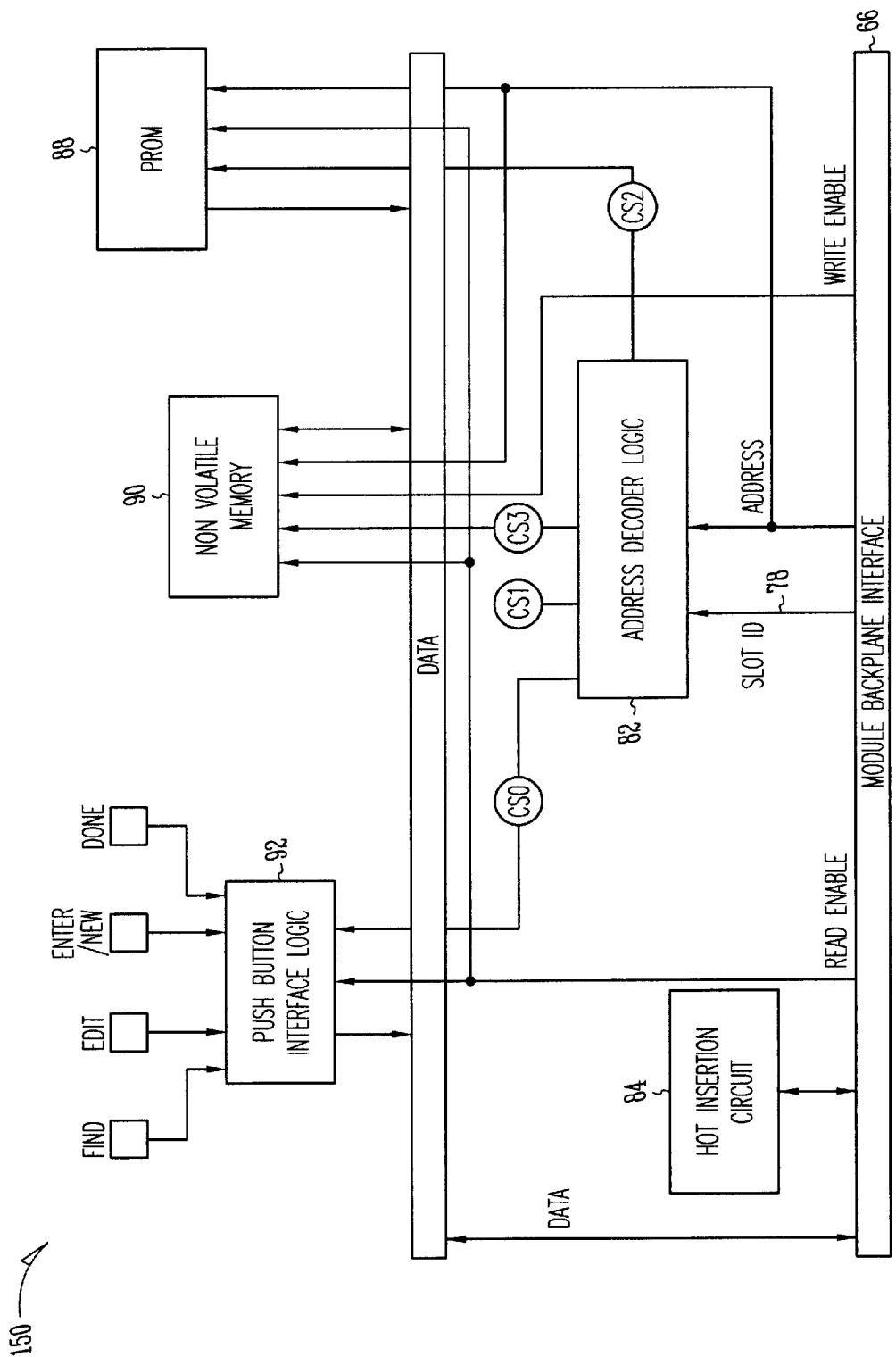
FIG. 19 illustrates a personal directory module which can be used in modular telephone system 10.

One embodiment of a personal directory module 150 is shown in FIG. 19. In the embodiment shown in FIG. 19, FIND, EDIT, ENTER/NEW, and DONE buttons provide access to the personal directory features. In addition, in one such embodiment, DELETE, SAVE, HELP, DIAL, UP/DOWN/FWD/REV hard or soft universal front panel buttons are controlled by data entry unit 60 or by a combination of data entry unit 60 and display 68. In another embodiment, module 150 includes no buttons; all functionality is accessed through soft or hard buttons using data entry unit 60 or by a combination of data entry unit 60 and display 68.

In one embodiment, the FIND button disables the DTMF from data entry unit 60 and causes CPU 44 to display the personal directory function on display 68. A user then uses data entry unit 60 (e.g., the numeric telephone keypad) to type in numbers or characters into module 150. As the characters are entered, they are displayed in display 68. In one such embodiment, depressing FIND again causes CPU 44 to search the personal directory for matching characters. A list of the closest matches is then displayed on display 68. In one embodiment, the FIND button causes system 10 to issue a # or * on telephone interface 24.

In one embodiment, such as is shown in FIG. 19, module 150 uses NVRAM to store directory data. Such an approach permits the user to remove module 150 from system 10 and carry the module to a different system 10 without losing the underlying directory information.

In one embodiment, the personal directory function displays a list of names and numbers in the personal directory in display 68. In one embodiment, depressing the EDIT button causes CPU 44 to highlight one of the entries of the personal directory and to display a set of soft keys clustered to the side of display 68. The soft keys identify editing functions which can be performed in the personal directory entries. In one such embodiment, a DELETE button is used to delete the highlighted entry from memory, an UP button is used to scroll up through the list of entries, a DOWN button is used to scroll down through a list of entries, a SAVE button is used to save the current selected entry into memory 90 and a DIAL button is used to dial the highlighted number.

The ENTER/NEW button prompts the user to enter the new number into module 150 using data entry unit 60 and displays the number on display 68 as it is entered. The DONE button signals that data entry following ENTER/NEW is completed.

In one embodiment, a CALLER ID CAPTURE button either on module 150 or displayed as a soft key on display 68 is used to capture an incoming number to the user's personal directory. Identifying data can then be entered by the user to complete the entry.

In one embodiment, base unit 40 includes a PC or PDA interface (USB, for example) in order to support exchange of personal directory data.

Figure 20:
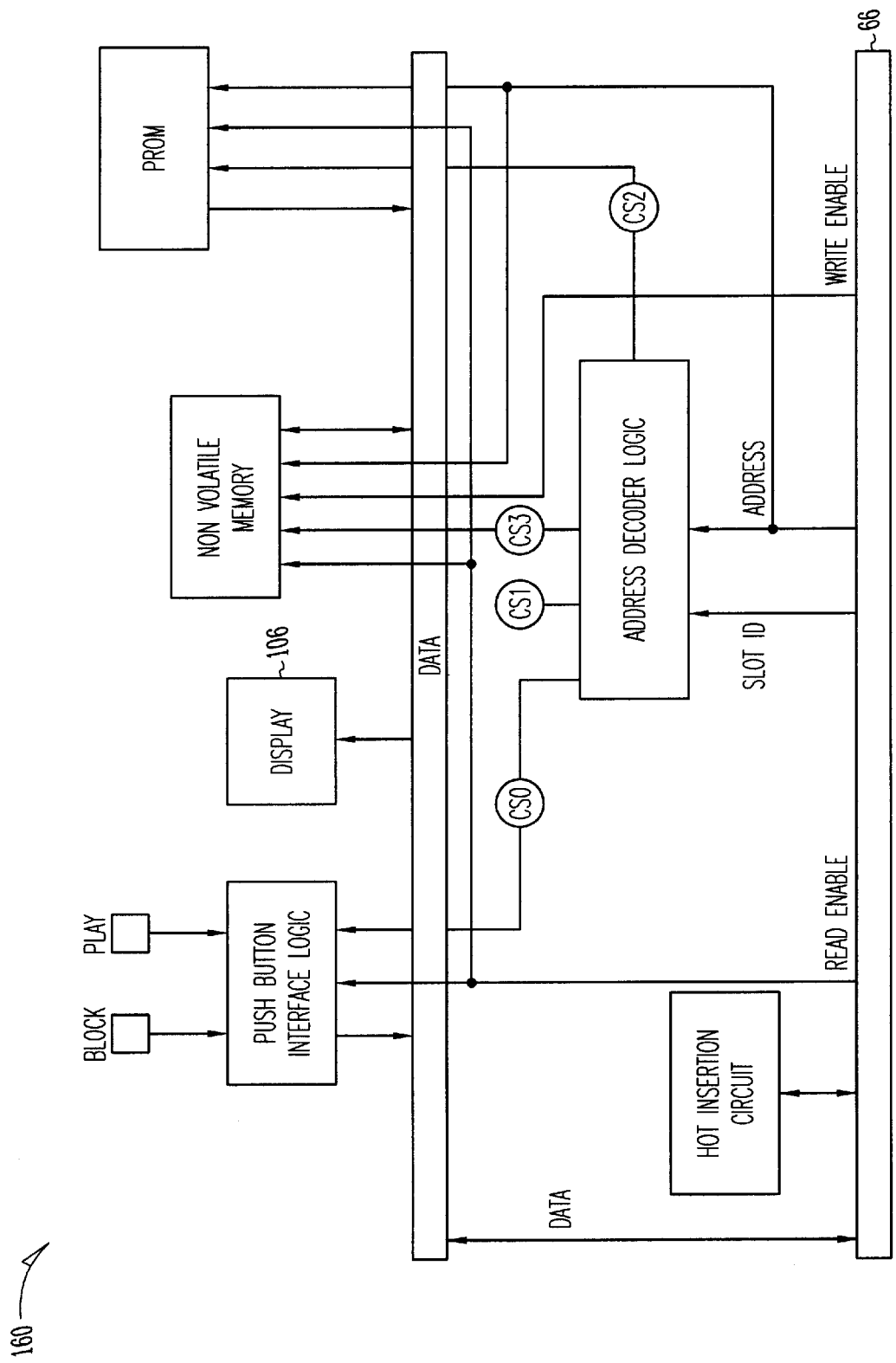
FIG. 20 illustrates a diverter module which can be used in modular telephone system 10.

FIG. 20 illustrates one embodiment of a diverter module 160 which can be used in modular telephone system 10. In one embodiment, diverter module 160 includes a BLOCK button and/or a PLAY button. The PLAY button, when depressed, directs the telephone to play a special message to the caller. Such a feature may be used to play a prerecorded message to, e.g., a persistent and annoying caller. The BLOCK button is used to capture the caller identifier (e.g., caller ID or biometric information such as voice recognition) of that persistent caller such that future calls are automatically answered with a prerecorded message. In another embodiment, one or more buttons are provided. Each button is associated with a prerecorded message. The recipient of a call can press one of the buttons and transfer the caller to the prerecorded message. For example, in a two button system, one message may be a pleasant greeting that terminates the call. A second message might be a more aggressive message to an annoying unwanted call.

In one embodiment, diverter module 160 includes a display 106. Display 106 can be used, e.g., to display the caller ID of the incoming caller. Diverter module 160 can also be used to redirect calls to one or more preset mailboxes or to an internal or external telephone number.

Figure 21:
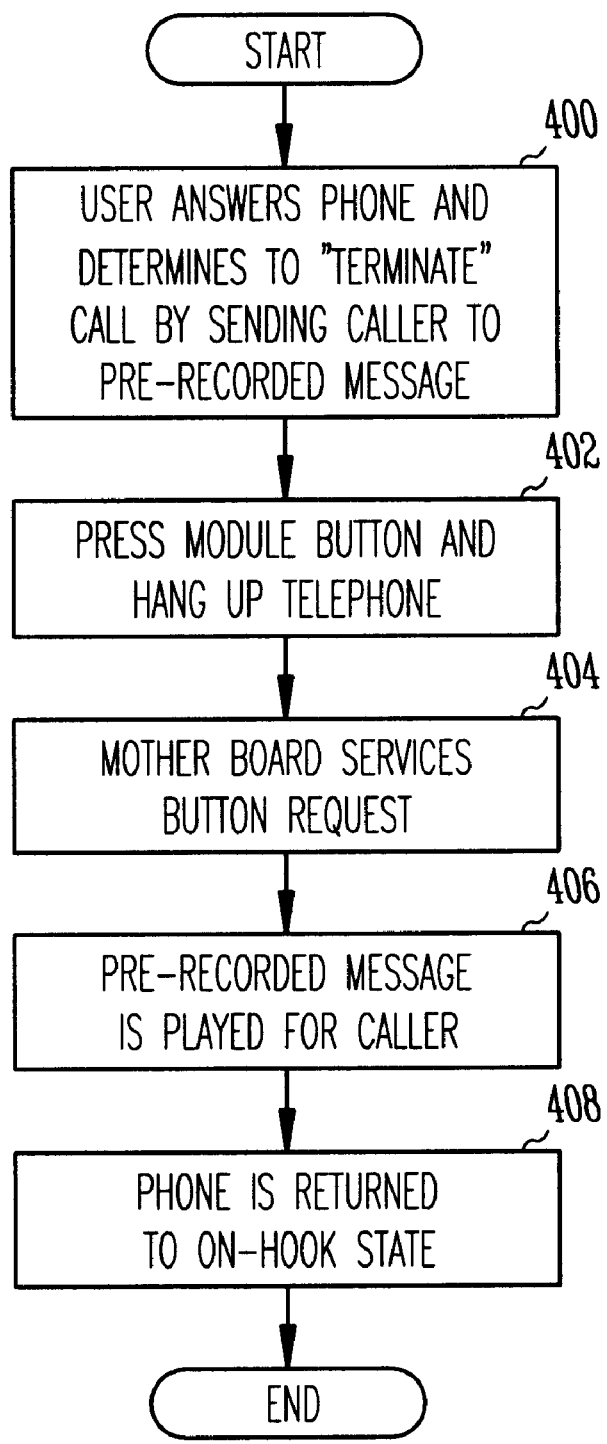
FIG. 21 illustrates a protocol used to divert calls using the diverter module of FIG. 20.

FIG. 21 illustrates a protocol which can be used to divert calls using diverter 160. As can be seen in FIG. 21, at 400 a user answers the telephone and determines to "terminate" the call by sending the caller to a prerecorded message. At 402, the user presses the PLAY button of module 160 and hangs up the telephone. Control moves to 404, CPU 44 services the PLAY button interrupt request and control moves to 406 where a message associated with the PLAY button is played for the caller. Control moves to 408 and the call is terminated.

Figure 22A:
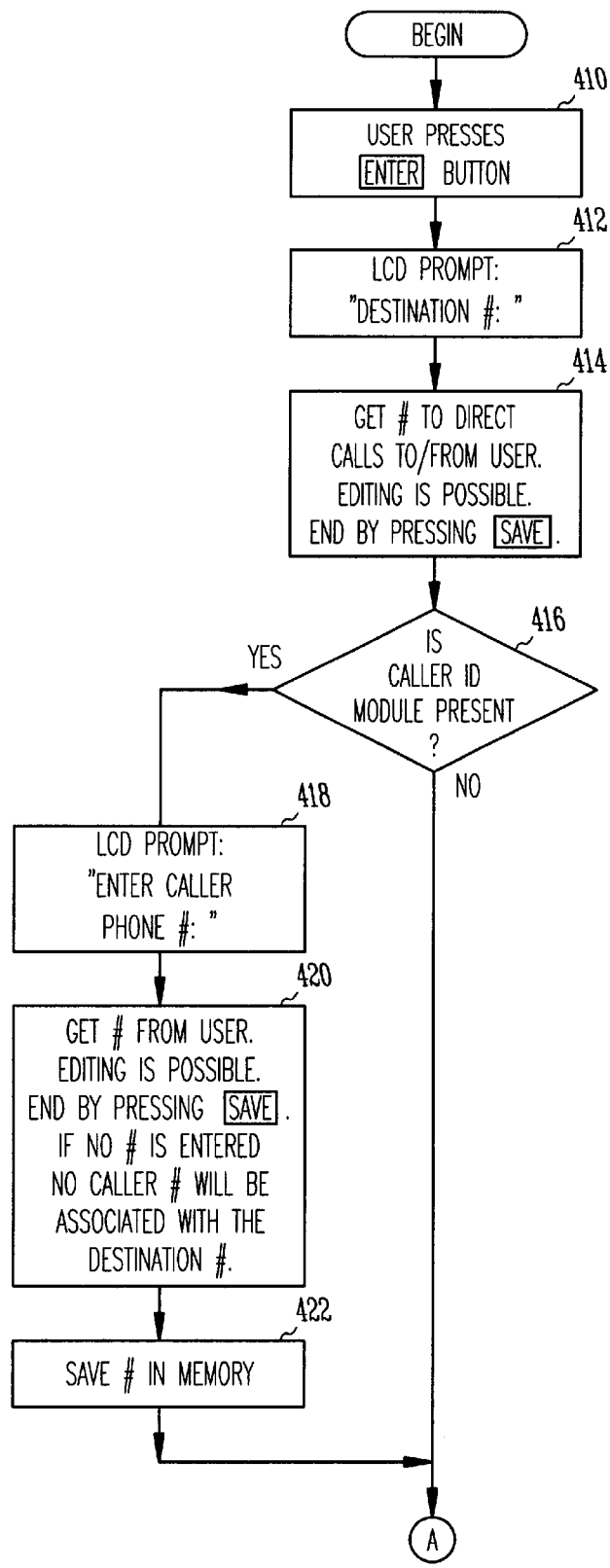
FIGS. 22a and b illustrate a protocol used to enter telephone numbers of calls to be diverted using the diverter module of FIG. 20.
Figure 22B:
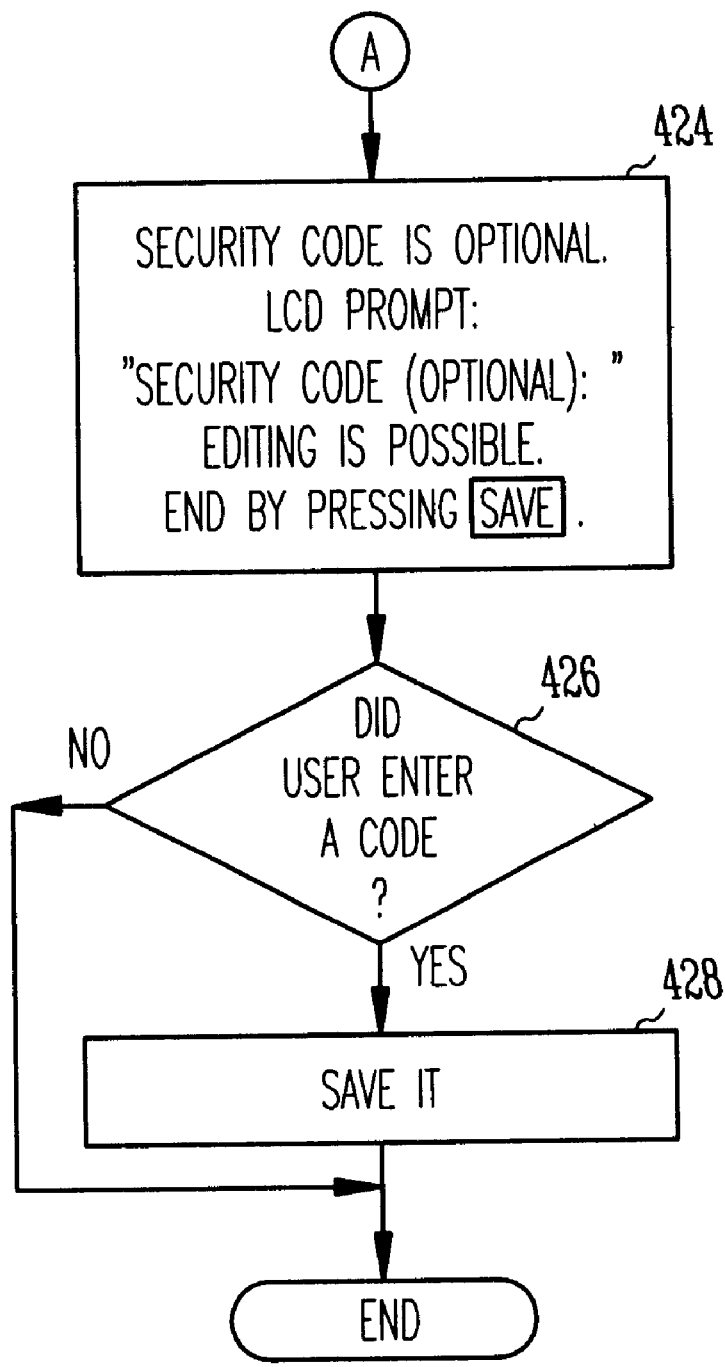
Figure 23A:
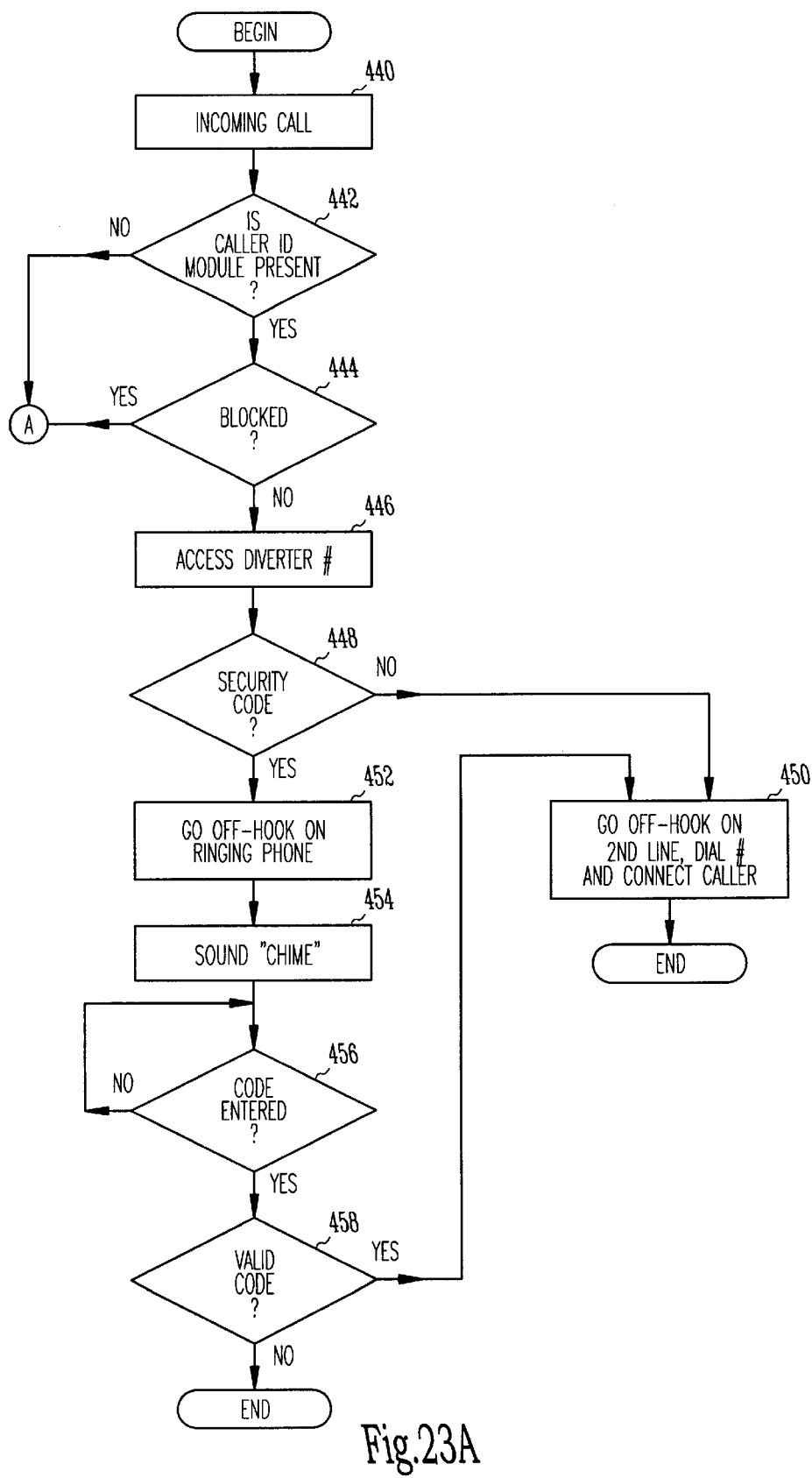
FIGS. 23a and b illustrate a protocol used to forward calls to another number using the diverter module of FIG. 20.
Figure 23B:
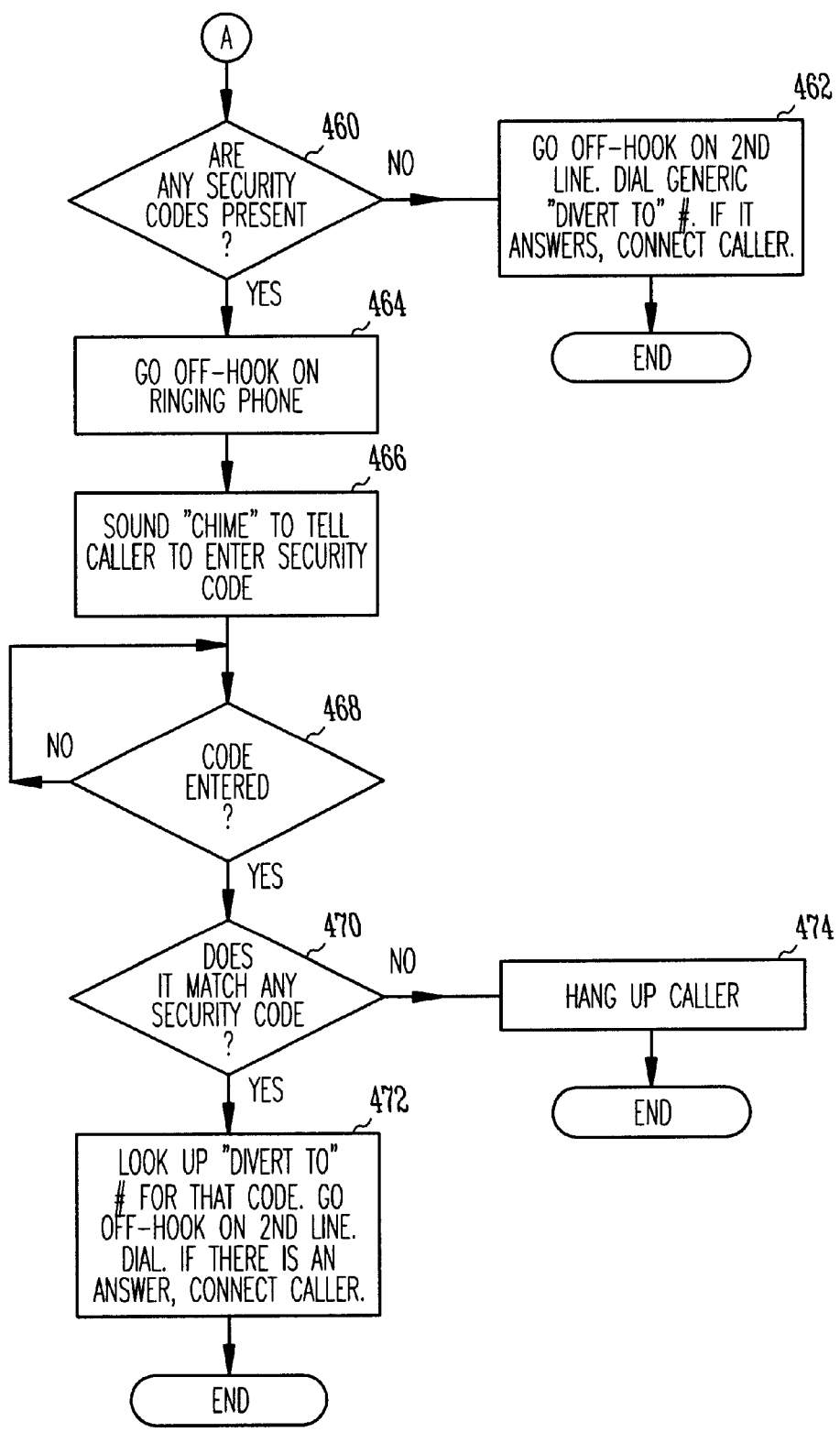

In one embodiment, diverter 160 can be used with a second telephone line to forward calls using the second line. In one embodiment, a FWD button on diverter 160 is used to automatically transfer a call to a prerecorded number on the second telephone line. An alternate protocol for accomplishing this is shown in FIGS. 22 and 23, which illustrate protocols that can be used to divert a call. FIG. 22, for example, illustrates a method of entering telephone numbers of calls to be diverted. In FIG. 22, at 410, the user selects the call diverter function on display 68 and selects "Enter". CPU 44 displays in response, at 412, a message such as "Enter destination number." At 414, the user enters the destination number. The number is stored in memory and displayed on display 68.

A check is made at 416 to determine if a caller identifier module is present. If so, control moves to 418 and CPU 44 displays a message such as "Enter caller telephone number." Control then moves to 420. If a number is entered at 420, calls having, for instance, that caller ID are routed to the number entered at 414. If no number is entered at 420, the number entered at 414 becomes a default number used for nomnatching caller IDS. Control then moves to 422 and the caller ID (if entered) is stored in memory on diverter 160.

Likewise, if a determination is made at 416 that no caller identifier module is present, the number entered at 414 is used as the destination of all incoming telephone calls.

In one embodiment, a security code can be associated with each caller identifier. In such an embodiment, system 10 will not forward a telephone call coming from a particular telephone number to the destination associated with its caller ID unless the caller successfully enters a predefined security code. One such embodiment is shown in FIG. 22. In such an embodiment, control moves from either 416 or 422 to 424, where CPU 44 displays a message such as "Enter security code." The user can enter a security code or enter a null string. If the user enters, at 426, a security code in conjunction with a caller identifier, a caller calling from a telephone having that caller identifier will have to enter the appropriate security code before that caller will be forwarded to the destination telephone associated with that caller identifier. Control then moves to 428 and the security code (if entered), the caller identifier (if available) and the diverter telephone number are saved in memory of module 160.

In operation, system 10 receives a caller ID (or other caller identification) at caller identifier module 140 and saves the identifier to memory. System 10 then accesses the diverter telephone number associated with that caller identifier. If there is no diverter telephone number associated with that caller identifier, the caller is diverted to the default number. If, however there is a diverter telephone number associated with that caller identifier, a check is made to see if a security code is required. If so, the user is prompted for the security code. If the security code and caller identifier are associated with a particular diverter telephone number the caller is forwarded to that number. Otherwise the caller is diverted to the default number.

One such embodiment is shown in FIG. 23. In FIG. 23, an incoming call is detected at 440 and control moves to 442 where a determination is made whether a caller identifier module 140 is present. If so, control moves to 444 and a determination is made as to whether the caller identifier is blocked. If not, control moves to 446 and the caller identifier is used to access a diverter telephone number associated with that caller identifier. (If no diverter telephone number is associated with that caller identifier, the default diverter telephone number is used.) Control then moves to 448 and CPU 44 determines if a security code is required for this caller identifier. If not, control moves to 450, system 10 goes off-hook on the second line and dials the appropriate diverter telephone number. If the telephone is answered on the second line, system 10 goes off-hook on the first line and completes the connection. CPU 44 must then monitor the two lines to detect if one goes on-hook. The call is then terminated.

If, at 448 a determination is made that a security code is required for this caller identifier, system 10 takes the first line off-hook at 452 and sounds a chime or other such sound at 454 to alert the caller to enter a security code. A check is made at 456 to see if a security code is entered and if the code entered was valid for that particular caller identifier. If so, control moves to 450 and the call is completed. Otherwise, the call is terminated.

If, at 442, no caller identifier module is detected, or if, at 444, it is discovered that the incoming call has blocked its caller ID, control moves to 460 where a check is made to see if there are any diverter numbers requiring security codes. If not, control moves to 462, system 10 goes off-hook on the second line and dials the default diverter telephone number. If the telephone is answered on the second line, system 10 goes off-hook on the first line and completes the connection. CPU 44 must then monitor the two lines to detect if one goes on-hook. The call is then terminated.

If, at 460, a determination is made that at least one diverter number is restricted by security code, control moves to 464 and system 10 takes the first line off-hook. Control then moves to 466 and system 10 sounds a chime or other such sound to alert the caller to enter a security code. A check is made at 468 to see if a security code is entered and at 470 to see if the code entered matches any of the security codes stored in memory. If so, control moves to 472, the diverter telephone number associated with that security code is retrieved and the call is completed. Otherwise, control moves to 474 and the call is terminated.

Figure 24:
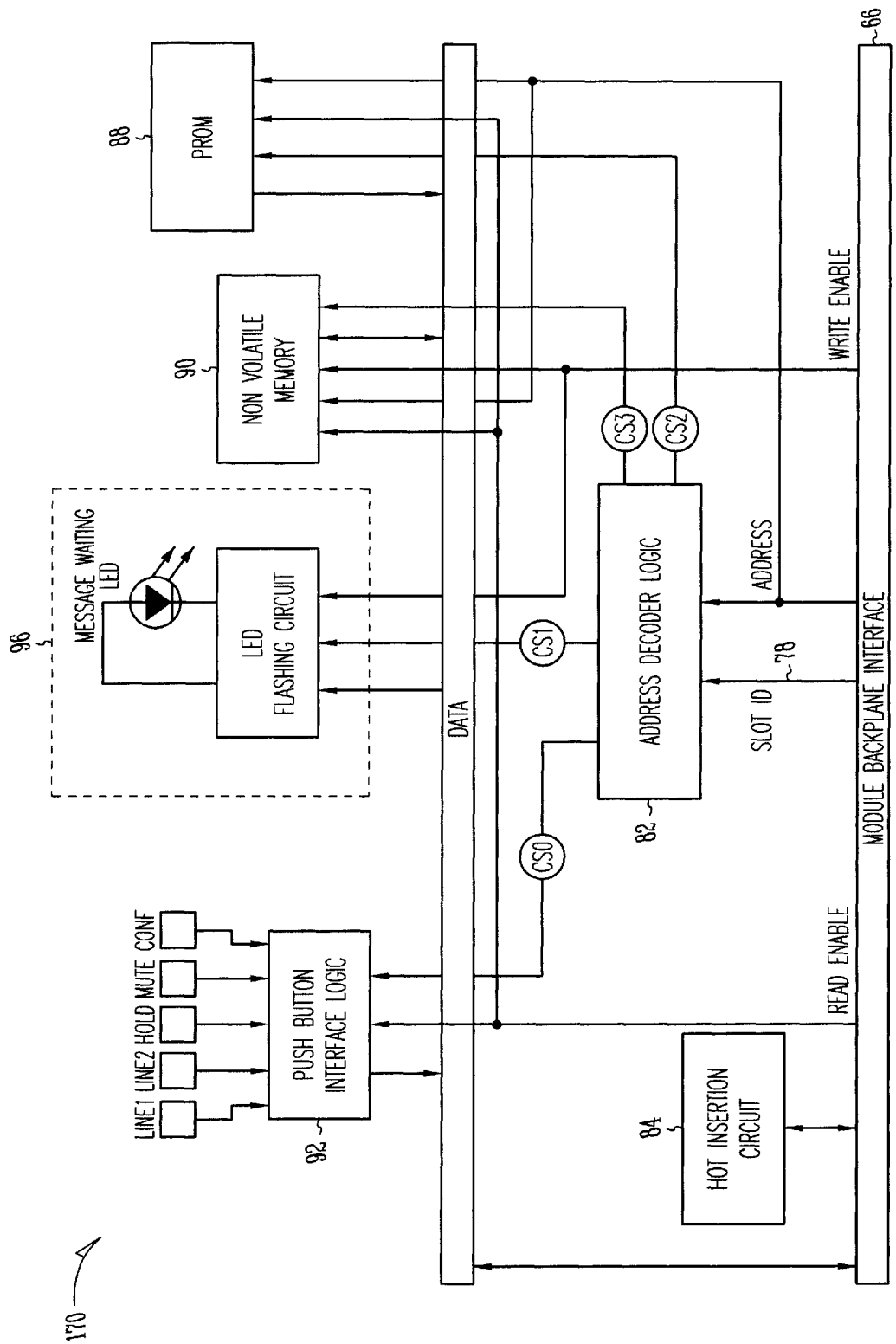
FIG. 24 illustrates a three way calling module which can be used in modular telephone system 10.

A variation on diverter module 160 is shown in FIG. 24. FIG. 24 shows a three way calling module 170 for use in a system 10 connected to two telephone lines. In one embodiment, module 170 includes a feedback mechanism 96 which indicates the status of each of the two telephone lines. For instance, in one such embodiment, an LED is associated with each telephone line. When the telephone line is active, the LED is held ON. When the telephone line is inactive the LED is held OFF. When the telephone line is on-hold, the LED flashes.

The embodiment of module 170 shown in FIG. 24 includes LINE1, LINE2, HOLD, MUTE and CONF buttons. Depressing LINE1 while off-hook seizes the first telephone line and lights its associated LED. Depressing LINE2 while off-hook seizes the second telephone line and lights its associated LED. Depressing the HOLD line places the current active line on hold and sets the associated LED to flashing. Depressing MUTE disables the telephone's microphone. Depressing CONF conferences the first and second telephone lines together. If a caller identifier module 140 is present, the numbers associated with the first and second telephone lines are displayed in display 68. In one embodiment, three way calling module includes only the program code and parameters needed to enable this feature. All the required buttons are displayed as soft keys on display 68 or are accessed through data entry unit 60.

In one embodiment, system 10 includes an electronic message pad feature which disables the DTMF of a telephone keypad in order to allow the user to enter information via the keypad while talking on the telephone. In one such embodiment, data entry unit 60 includes a telephone keypad and a DTMF DISABLE pushbutton located on the face of system 10 which is used solely to disable DTMF tones from the telephone keypad. If a user wishes to capture numeric information on display 68 by using the telephone keypad, he or she depresses the DTMF DISABLE button on the face of system 10. In one embodiment, a user wishing to capture numeric information on a telephone keypad presses the DTMF DISABLE button. Depressing the button results in an interrupt to CPU 44. The interrupt generated by DTMF DISABLE is serviced and a command is sent from CPU 44 to the keypad to disable DTMF generation if any key is pressed. The keypad/ microprocessor interface are designed such that disabling the DTMF generation does not interfere with transmission of data from the keypad to CPU 44. The user can then enter data and the data entered is displayed on display 68. It can then be captured and saved to personal directory module 150, if present. In one embodiment, DTMF generation, once disabled, is re-enabled by depressing DTMF DISABLE again.

In another embodiment, an electronic message pad feature is designed which does not require preventing DTMF tones from reading the central office. Such a feature can be used on-hook to update, for instance, a personal directory module 150.

Figure 26:
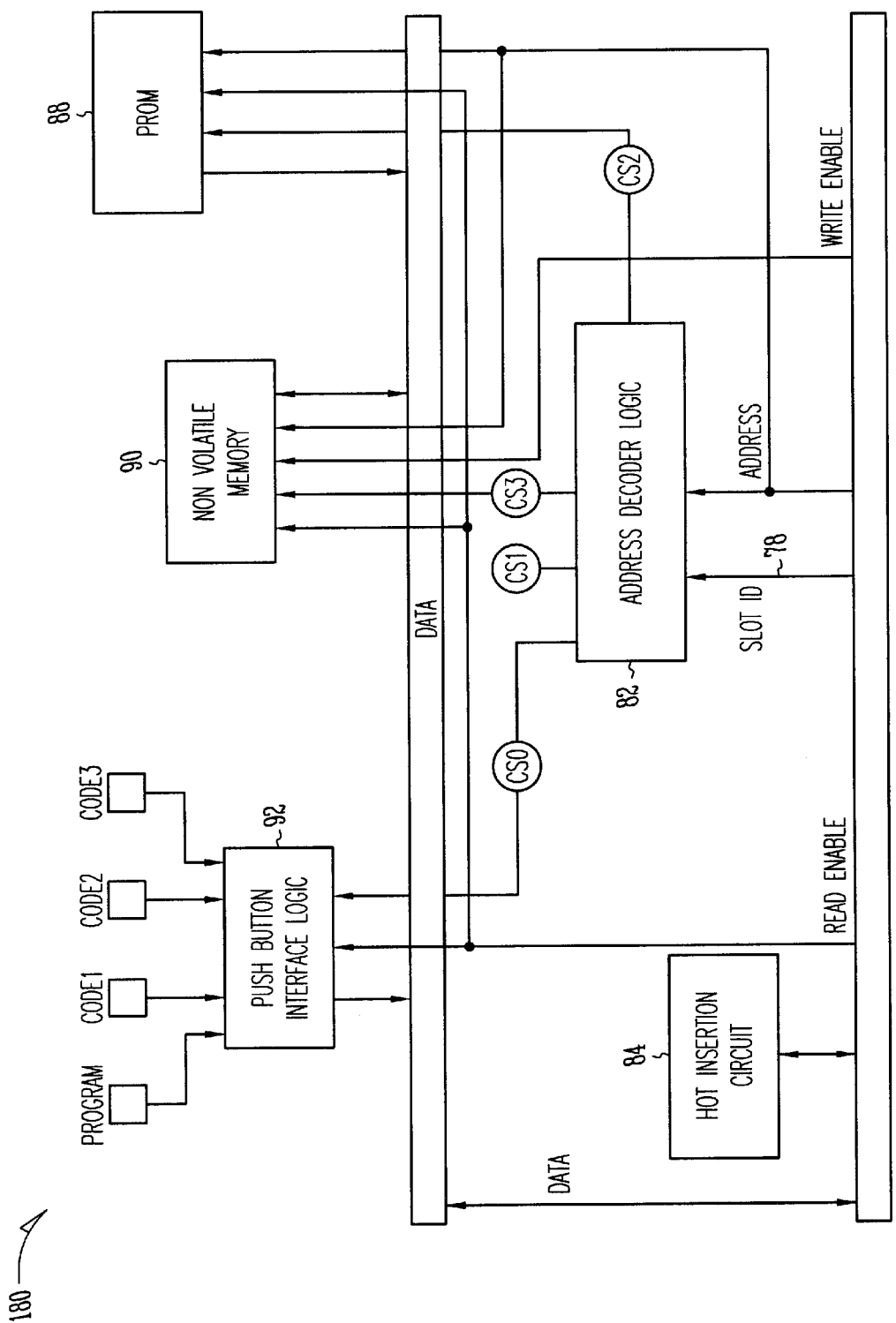
FIG. 26 illustrates an area code dialing module which can be used in modular telephone system 10.

Yet another module which can be used in a system such as system 10 is illustrated in FIG. 26. FIG. 26 illustrates an area code module 180 which can be used to preprogram the numbers for frequently dialed area codes. In the embodiment shown in FIG. 26, four buttons are provided for module 180: PROGRAM, CODE 1, CODE 2, and CODE 3. Up to three area codes can be stored and accessed through the buttons CODE 1, CODE 2, and CODE 3. In one embodiment, the PROGRAM button puts module 180 in a "store" mode, permitting capture of digits entered in data entry unit 60. If the PROGRAM button is pressed in conjunction with the CODE 1 button, the number is entered into memory associated with the CODE 1 button. Similarly, if the PROGRAM button is pressed in conjunction with the CODE 2 or CODE 3 button, the number subsequently entered is stored into memory associated with the CODE 2 or CODE 3 buttons, respectively.

Then when system 10 goes off-hook and one of the code buttons is pressed, the numbers stored in the memory associated with that button are retrieved and DTMF tones representative of those numbers are transmitted to the central office.

It should be apparent that there are other uses for the code buttons of module 180 besides for storing area codes. The code buttons could be used to store PIN numbers or even the security codes required by many of the modules described above. In addition, in one embodiment, one can program a code button with the exchange number of the most commonly used exchange, or with a single telephone number.

The telephone system according to the present invention has a number of advantages. The phone unit is modular, allowing users to tailor phone features to their needs and preferences, providing virtually unlimited upgradability and eliminating clutter by replacing multiple peripherals with an integrated solution. The feature modules are portable. Modules can be used in more than one base unit; the base unit will immediately recognize the functionality and add it to the existing system. The result is a telephone system which can provide a range of features, allowing the user to build capabilities over time.

The modules themselves provide a number of advantageous features. Each module provides a simplified, easily understandable interface, making high-tech features readily available to non-tech users. The user simply plugs in a module to add features like caller-ID and voice messaging. More importantly, complex features normally seen only in sophisticated PBX systems can be added with the same simple approach.

At the same time any of the features described in connection with the modules can be integrated into the base unit of system 10. Claims to features of telephone system 10 are therefore to be limited only by the language of the claims.

The above approach of adding features to telephones can be used to add features to other electronic devices as well. An electronic system 600 is shown for instance in FIG. 27. In FIG. 27, electronic system 600 includes a base unit 601 having a processing unit 602 (e.g., a microcontroller or microprocessor) connected to a memory 604. In addition, processing unit 602 is connected through a module slot interface 608 to at least one module slot 606. Module slot 606 is capable of receiving a module 610 having a memory 612. In one embodiment, memory 604 is nonvolatile memory.

In one embodiment, a module 610 adding new features to base unit 601 is connected through module slot 606 to module slot interface 608. In one such embodiment, processing unit 602 operates in cooperation with module slot interface 608 to read information from a module 610 installed in one of the module slots 606 into memory 604.

Module 610 is used to install a new feature in an electronic system. For instance, base unit 601 may be a bread making machine and module 610 may be used to add a new breadmaking process to system 600. The process may be, for instance, introduction of a pause function used to allow the cook to add additional ingredients. In order to add such a function, module 610 would include (stored in memory 612) program code 620 for programming processing unit 602 with the new process. In addition, module 610 may include updated application code 622 for updating the basic application (e.g., to correct a bug in the code) and updated parameter information (e.g., new calibration data) for use by electronic system 600. As in the telephone system described above, this information is downloaded to memory 604 when module 610 is plugged into slot 606.

Finally, module 610 may include one or more buttons 614 used to indicate to processing unit 602 that a user-controlled event has occurred (e.g., that all necessary ingredients have been added during the pause period in the breadmaking example given above) and a hot insertion circuit (not shown) to protect module 610 from hot insertion into system 600. In another embodiment, soft keys may be used in place of buttons 614 where supported within base unit 601.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A modular telephone, comprising:
   one or more module slots, including a first module slot, wherein each module slot is configured to receive a module adding a feature to the modular telephone;
   a processing unit, wherein the processing unit includes a module slot interface and memory, wherein the module slot interface is connected to each module slot and is adapted to read information from a module installed in the first module slot;
   a data entry device; and
   a telephone subsystem connected to the processing unit and the data entry device, wherein the telephone module operates in cooperation with the processing unit and the data entry device to provide a feature based on information read from a module installed in the first module slot, wherein the telephone subsystem includes:
   a telephone circuit connected to the data entry device;
   service connecting means for connecting the telephone circuit to a telephone service;
   a receiver; and
   a microphone.

2. The telephone according to claim 1, wherein the service connecting means includes a tip and ring interface.

3. The telephone according to claim 1, wherein the first module slot includes circuitry which reads application code stored in a module installed in the first module slot.

4. The telephone according to claim 1, wherein the first module slot includes circuitry which reads operating system code stored in a module installed in the first module slot, wherein the operating system code is used to update operation of the processing unit.

5. The telephone according to claim 1, wherein the memory includes a plurality of distinctive ring locations, wherein each distinctive ring location contains data representative of a distinctive ring signal.

6. The modular telephone according to claim 1 wherein the modular telephone further comprises a display screen.

7. The modular telephone according to claim 6 wherein the modular telephone further comprises soft keys displayed on the display screen.

8. A method of installing a feature in an electronic system, wherein the electronic system includes a processing unit, comprising:
   providing a module having memory;
   storing information relevant to the feature into the module memory; and
   transferring the relevant information to the electronic system, wherein transferring includes reading operating system code from the module memory, wherein the operating system code is used to update operation of the processing unit.

9. A method of executing an added feature in an electronic system, wherein the electric system includes a processing unit, comprising:
   providing a module having memory and a user interface;
   storing information relevant to the feature into the module memory;
   tansferring the relevant information to the electronic system; and
   accessing the feature, wherein accessing includes entering commands via the user interface.

10. The method according to claim 9, wherein the user interface is a pushbutton and wherein entering commands includes depressing the pushbutton.

11. A peripheral device which operates in conjunction with a telephone to add features to the telephone, comprising:
   one or more module slots, including a first module slot, wherein each module slot is configured to receive a module adding features to the telephone;
   a processing unit, wherein the processing unit includes a module slot interface and memory, wherein the module slot interface is connected to each module slot and is adapted to read information from a module installed in the first module slot; and
   a telephone interface which operates in cooperation with the processing unit to provide a feature based on information read from a module installed in the first module slot, wherein the telephone interface includes a relay for disconnecting the telephone from a central office.

12. The peripheral device according to claim 11, wherein the peripheral device receives a modulated signal, digitizes the modulated signal to form an incoming digitized signal and saves the incoming digital signal to memory.

13. The peripheral device according to claim 11 wherein the peripheral device reads a message from memory, converts the message to an analog signal and drives the analog signal out through the telephone interface.

14. The peripheral device according to claim 11 wherein the peripheral device further comprises a data entry device connected to the processing unit and the telephone subsystem.

15. The peripheral device according to claim 14 wherein the data entry device comprises a display screen.

* * * * *